US012384971B2

(12) United States Patent
Choi et al.

(10) Patent No.: US 12,384,971 B2
(45) Date of Patent: Aug. 12, 2025

(54) PROCESSES FOR VISCOSITY BREAKING OF PLASTICS

(71) Applicant: Saudi Arabian Oil Company, Dhahran (SA)

(72) Inventors: Ki-Hyouk Choi, Dhahran (SA); Abdullah Tariq AlAbdulhadi, Dhahran (SA); Joo-Hyeong Lee, Dhahran (SA); Young Kyoung Ahn, Dhahran (SA); Abdullah Saleh Yami, Dhahran (SA); Saad Abdullah Shahrani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/471,545

(22) Filed: Sep. 21, 2023

(65) Prior Publication Data

US 2024/0158698 A1    May 16, 2024

Related U.S. Application Data

(63) Continuation of application No. 18/055,986, filed on Nov. 16, 2022, now Pat. No. 11,802,245.

(51) Int. Cl.
*C10G 1/02* (2006.01)
*B09B 3/45* (2022.01)
(Continued)

(52) U.S. Cl.
CPC ............... *C10G 1/002* (2013.01); *B09B 3/45* (2022.01); *B09B 3/80* (2022.01); *B09B 2101/77* (2022.01);
(Continued)

(58) Field of Classification Search
CPC ............ C10G 1/002; C10G 2300/1003; C10G 2300/301; C10G 2300/4081; B09B 3/45; B09B 3/80; B09B 2101/77
See application file for complete search history.

(56) References Cited

U.S. PATENT DOCUMENTS 5,639,937 A  *  6/1997  Hover ..................... C10G 1/10
                                                         208/72
6,352,674 B2    3/2002  Matsubara et al.
(Continued)

FOREIGN PATENT DOCUMENTS

BY          13420 C1  *  8/2010
DE       4329435 C1     12/1994
(Continued)

OTHER PUBLICATIONS

Miadonye et al. "Microwave Radiation induced Visbreaking of Heavy Crude Oil; Jun. 2014; Journal Petroleum Science Research vol. 3 Issue 3; pp. 1-6" (Year: 2014).*
(Continued)

*Primary Examiner* — Thuan D Dang
(74) *Attorney, Agent, or Firm* — DINSMORE & SHOHL LLP

(57) ABSTRACT

A process for converting solid plastic waste to hydrocarbon oil includes melting a feed comprising solid plastic waste to produce a liquefied plastic stream and visbreaking the liquefied plastic stream in a visbreaker unit having a visbreaker furnace and a soaker vessel. Visbreaking includes heating the liquefied plastic stream in the visbreaker furnace to produce a heated liquefied plastic stream, maintaining the heated liquefied plastic stream at the reaction temperature in the soaker vessel for a residence time to produce a visbreaker effluent, and injecting a stripping gas into the soaker vessel. The stripping gas includes at least one of steam, nitrogen, helium, argon, or combinations of these. The
(Continued)

process includes introducing the stripping gas to the liquefied plastic stream upstream of the visbreaker furnace, the heated liquefied plastic stream downstream of the visbreaker furnace, or both. The visbreaker effluent is separated to produce a liquid hydrocarbon oil.

17 Claims, 3 Drawing Sheets

(51) Int. Cl.
*B09B 3/80* (2022.01)
*C10G 1/00* (2006.01)
*B09B 101/77* (2022.01)

(52) U.S. Cl.
CPC .............. *C10G 2300/1003* (2013.01); *C10G 2300/301* (2013.01); *C10G 2300/4081* (2013.01)

(56) References Cited

U.S. PATENT DOCUMENTS

| | | | |
|---|---|---|---|
| 8,809,606 | B2 | 8/2014 | Appel et al. |
| 10,442,997 | B2 | 10/2019 | Narayanaswamy et al. |
| 2008/0099376 | A1* | 5/2008 | He .................. C10G 31/08 208/264 |
| 2010/0160709 | A1 | 6/2010 | Grierson et al. |
| 2021/0189263 | A1 | 6/2021 | Choi et al. |

FOREIGN PATENT DOCUMENTS

| | | |
|---|---|---|
| JP | 2012136672 A | 7/2012 |
| WO | 199708266 A1 | 3/1997 |
| WO | 9802401 A1 | 1/1998 |
| WO | 2022034448 A1 | 2/2022 |

OTHER PUBLICATIONS

Czajczynska et al., "Potential of pyrolysis process in the waste management sector", Thermal Science and Engineering Progress, vol. 3, pp. 171-197, 2017.
Poerschmann et al., "Hydrothermal carbonization of poly(vinyl chloride)", Chemosphere, vol. 119, pp. 682-689, 2015.
Wang et al., "Low chlorine oil production through fast pyrolysis of mixed plastics combined with hydrothermal dechlorination pretreatment", Process Safety and Environmental Protection, vol. 149, pp. 105-114, May 2021.
"Visbreaker", Wikipedia, Evedux, revised on Jan. 2020, retrieved from httpa://en.wikipedia.org/w/index.php?title=Visbreaker&oldid=937755183 (5 pages).
Notification of Transmittal of the International Search Report and the Written Opinion of the International Searching Authority, or the Declaration dated Jan. 22, 2024 pertaining to International application No. PCT/US2023/033807 filed Sep. 27, 2023, pp. 1-13.
"Tire Fed Coking Unit", Research Disclosure, Kenneth Mason Publications, Hampshire, UK, GB, No. 448, Aug. 1, 2001, pp. 1365-1367.

* cited by examiner

PROCESSES FOR VISCOSITY BREAKING OF PLASTICS

CROSS-REFERENCE TO RELATED APPLICATIONS

This application is a continuation of and claims priority to U.S. Non-Provisional application Ser. No. 18/055,986 filed Jul. 7, 2023, which is incorporated by reference herein in its entirety.

BACKGROUND

Field

The present disclosure relates to systems and processes for converting solid plastic waste to petrochemical products or intermediates and, in particular, systems and processes for viscosity breaking of solid plastic waste to produce petrochemical products or intermediates.

Technical Background

The visbreaker unit has been a common refining process in conventional refineries for converting crude oil to greater value petrochemical products and intermediates. Visbreaking has traditionally been utilized for producing less viscous fuel oil from highly viscous residues. However, limited upgrading capability of the visbreaker unit makes it less attractive for processing heavy residues. In particular, recent refining processes are required to have substantial upgrading capability in converting heavy residue to light distillates while removing heteroatoms such as sulfur and metals. The visbreaker unit is not able to provide such capabilities due to the limited severity of the operation conditions. Thus, refineries are finding it more and more challenging to maintain utilization of visbreaker units in the refinery process.

The use of plastics in commercial and industrial application has become prolific. The increasing use of plastics worldwide has increased the generation of waste plastic, which presents a sustainability opportunity. Development of processes for converting water plastics into reusable materials is continuing. Polyvinyl chloride (PVC) is one of the most abundant plastics used for consumable goods. PVC has relatively high abrasion resistance, mechanical strength, hardness, and durability, and it is also stable in various chemical environments. By adding a plasticizer, the PVC plastic can be highly flexible. Waste plastic can contain from 1 weight percent (wt. %) to 5 wt. % PVC. However, recycling of used PVC is very difficult due to the presence of chlorine in the structure.

SUMMARY

Accordingly, there is an ongoing need for systems and processes for converting waste plastic to hydrocarbon oils suitable as feedstocks for steam cracking, hydrotreating, or both. The present disclosure is directed to systems and processes for converting waste plastics into a liquid hydrocarbon oil utilizing a visbreaker unit. The systems may include a melting vessel and the visbreaker unit downstream of the melting vessel. The melting vessel may be operable to melt the solid plastic wastes to provide a liquefied plastic waste, and the visbreaker unit may be operable to convert the liquid waste plastic into a liquid hydrocarbon oil, which may be suitable as a hydrocarbon feed to a steam cracker or a hydrotreating unit. The processes of the present disclosure may include melting the solid plastic waste to produce a liquefied plastic waste followed by visbreaking the liquefied plastic waste to produce the liquid hydrocarbon oil. The process may further include introducing a stripping gas to a soaker vessel of the visbreaker unit, to the liquefied plastic stream upstream of the soaker vessel, or both. The systems and processes of the present disclosure may further include a supercritical water system downstream of the visbreaker unit to further upgrade the liquid hydrocarbon oil.

The systems and processes of the present disclosure are operable to convert waste products, such as solid plastic waste, into a liquid hydrocarbon oil that can be further converted more valuable liquid and gaseous petrochemical products by passing the liquid hydrocarbon oil to downstream converting processes such as a steam cracker, hydrotreating unit, or both. The systems and processes also provide a new alternative use for existing visbreaker systems that are already part of many refinery complexes.

According to at least one aspect of the present disclosure, a process for converting solid plastic waste to hydrocarbon oil may include melting a feed comprising the solid plastic waste to produce a liquefied plastic stream and visbreaking the liquefied plastic stream in a visbreaker unit comprising a visbreaker furnace and a soaker vessel downstream of the visbreaker furnace. The visbreaking may comprise heating the liquefied plastic stream in the visbreaker furnace to produce a heated liquefied plastic stream having a temperature at which the plastic undergoes one or more chemical reactions to convert polymer molecules in the liquefied plastic stream to one or more smaller molecules, maintaining a heated liquefied plastic stream at the reaction temperature in the soaker vessel for a residence time to produce a visbreaker effluent, and injecting a stripping gas into the soaker vessel, where the stripping gas comprises at least one of steam, nitrogen, helium, argon, or combinations of these stripping gases. The process may further include introducing the stripping gas to the liquefied plastic stream upstream of the visbreaker furnace, the heated liquefied plastic stream downstream of the visbreaker furnace, or both. The process may further include separating the visbreaker effluent in a visbreaker effluent separation system to yield a product comprising liquid hydrocarbon oil and a lesser boiling effluent.

Additional features and advantages of the aspects of the present disclosure will be set forth in the detailed description that follows and, in part, will be readily apparent to a person of ordinary skill in the art from the detailed description or recognized by practicing the aspects of the present disclosure.

BRIEF DESCRIPTION OF THE DRAWINGS

The following detailed description of the present disclosure may be better understood when read in conjunction with the following drawings in which.

Figure 1:
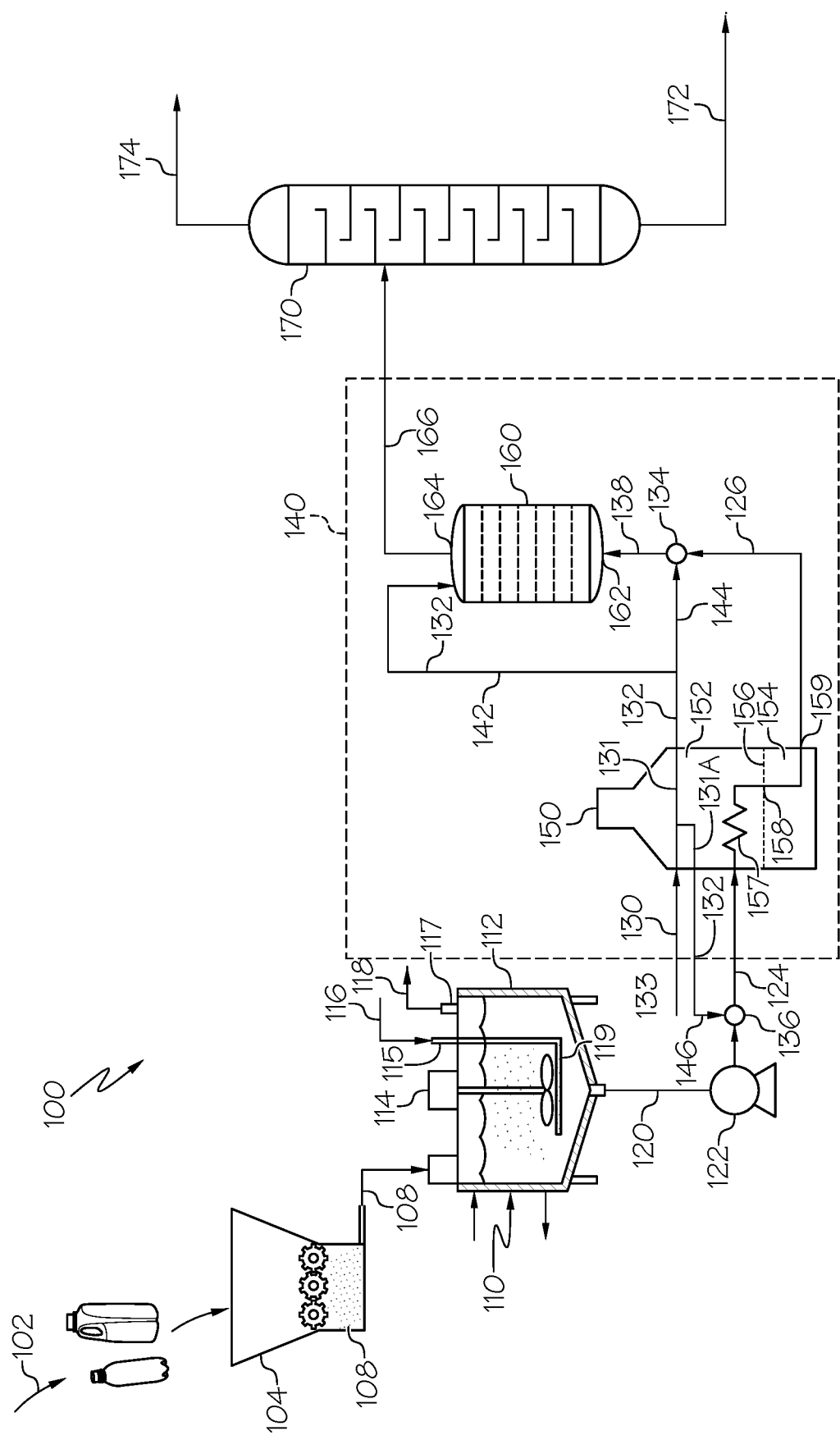
FIG. 1 schematically depicts a generalized flow diagram of a process for converting waste plastic to hydrocarbon oil, according to one or more aspects shown and described in the present disclosure.
Figure 2:
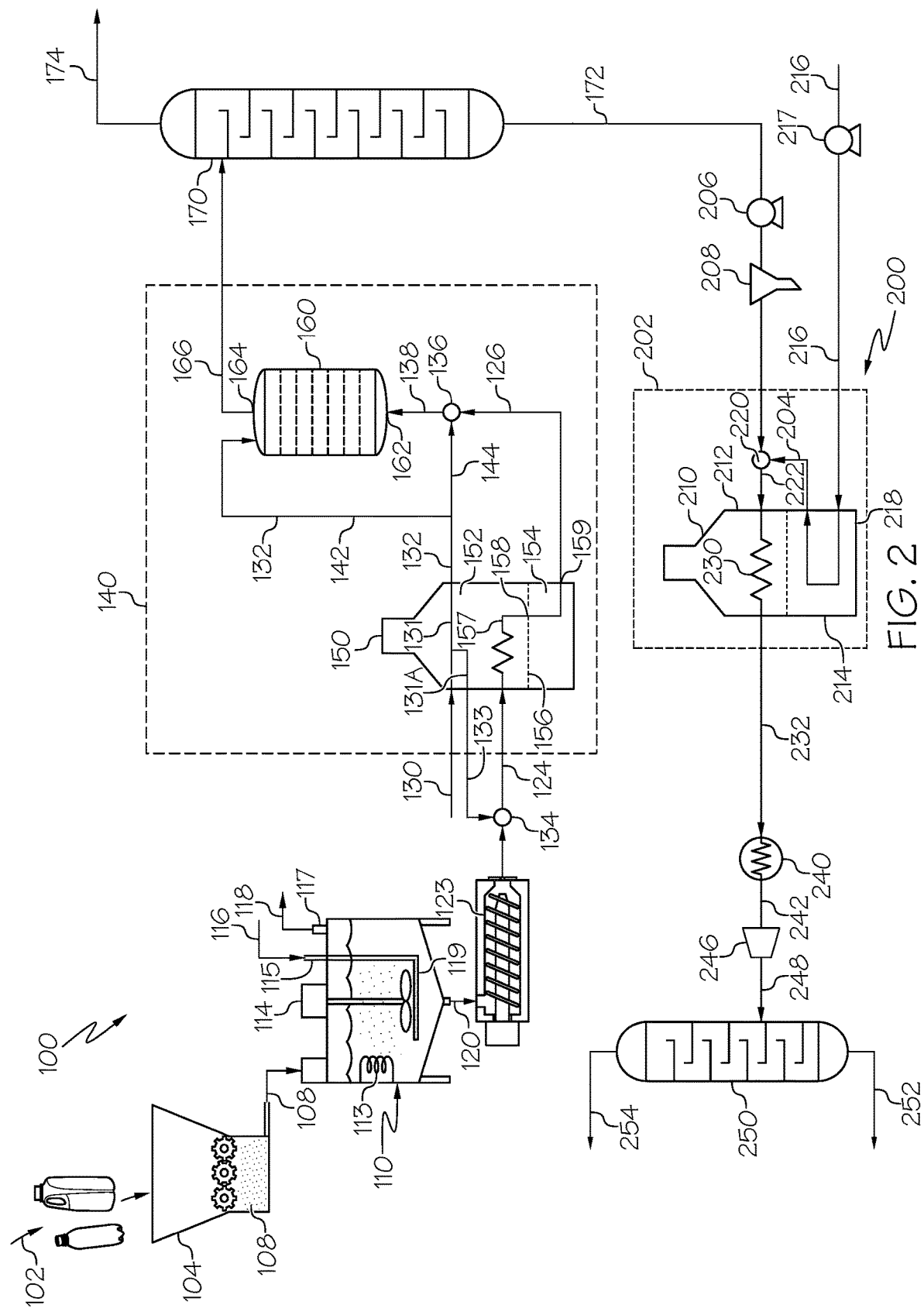
FIG. 2 schematically depicts a generalized flow diagram of another process for converting waste plastic to hydrocarbon oil, according to one or more aspects shown and described in the present disclosure.
Figure 3:
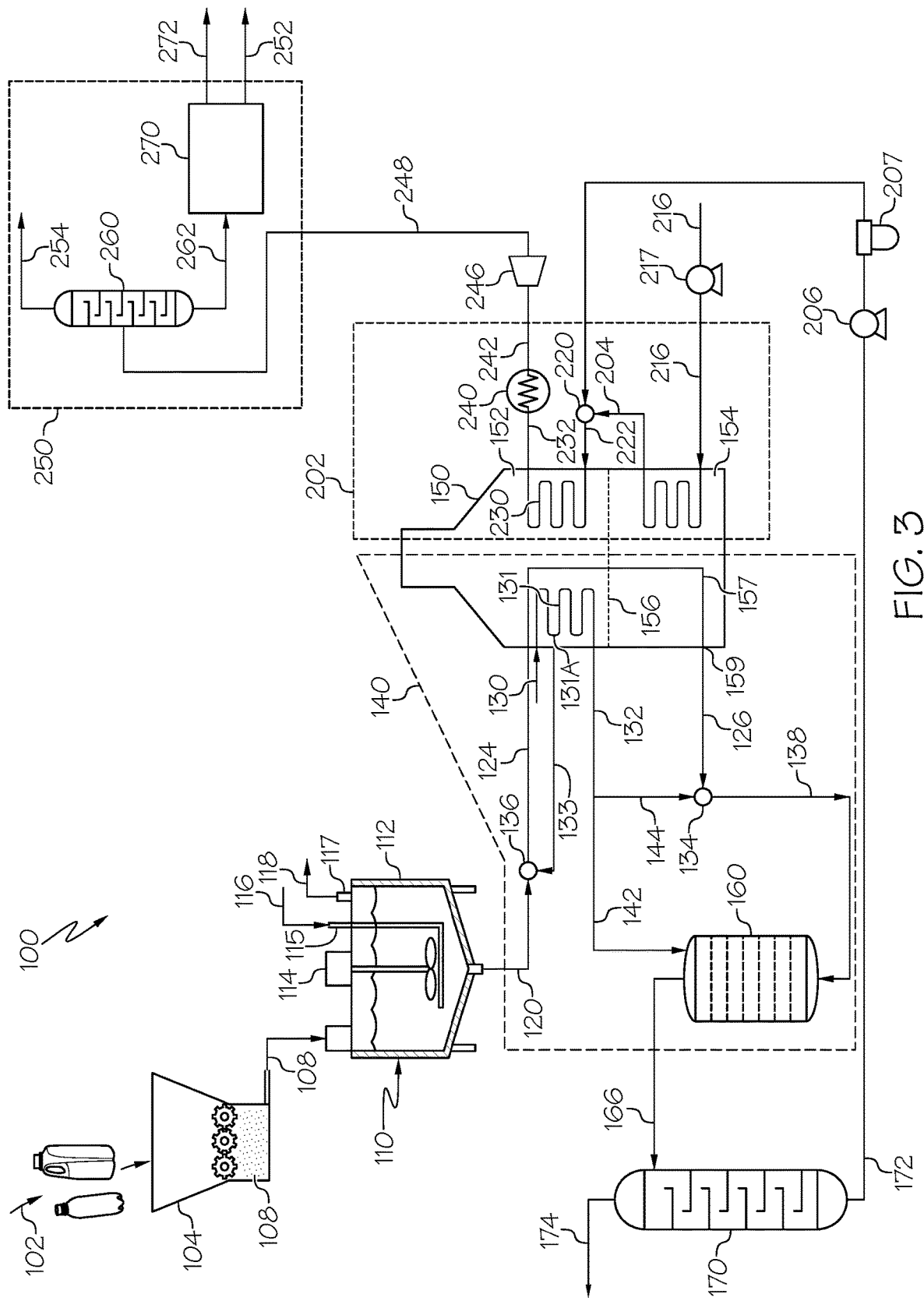
FIG. 3 schematically depicts a generalized flow diagram of still another process for converting waste plastic to hydrocarbon oil, according to one or more aspects shown and described in the present disclosure.

When describing the simplified schematic illustrations of FIGS. 1-3, many of the numerous valves, temperature sensors, electronic controllers, and the like, which may be used and are well known to a person of ordinary skill in the art, may not be included. Further, accompanying components that are often included in systems such as those depicted in FIGS. 1-3, such as air supplies, heat exchangers, surge tanks, and the like are also not included. However, a person of ordinary skill in the art understands that these components are within the scope of the present disclosure.

Additionally, the arrows in the simplified schematic illustrations of FIGS. 1-3 refer to process streams. However, the arrows may equivalently refer to transfer lines, which may transfer process steams between two or more system components. Arrows that connect to one or more system components signify inlets or outlets in the given system components and arrows that connect to only one system component signify a system outlet stream that exits the depicted system or a system inlet stream that enters the depicted system. The arrow direction generally corresponds with the major direction of movement of the process stream or the process stream contained within the physical transfer line signified by the arrow.

The arrows in the simplified schematic illustrations of FIGS. 1-3 may also refer to process steps of transporting a process stream from one system component to another system component. For example, an arrow from a first system component pointing to a second system component may signify "passing" a process stream from the first system component to the second system component, which may comprise the process stream "exiting" or being "removed" from the first system component and "introducing" the process stream to the second system component.

Moreover, two or more lines intersecting in the simplified schematic illustrations of FIGS. 1-3 may refer to two or more process streams being "mixed" or "combined". Mixing or combining two or more process streams may comprise mixing or combining by directly introducing both streams into a like reactor, separation device, or other system component. For example, two lines intersecting prior to entering a system component may signify the introduction of the two process streams into the system component, in which mixing or combining occurs.

Reference will now be made in greater detail to various aspects of the present disclosure, some of which are illustrated in the accompanying drawings.

DETAILED DESCRIPTION

The present disclosure is directed to systems and processes for converting waste plastics to hydrocarbon oils that can be used as feed streams for steam cracking, hydrotreating, hydrocracking, of combinations of these. In particular, the present disclosure is directed to converting waste plastics to hydrocarbon oils using systems and processes that include visbreaking. Referring now to FIG. 1, one embodiment of a system 100 for converting solid plastic waste 102 to a hydrocarbon oil suitable as a feed for steam cracking, hydrotreating, or hydrocracking is schematically depicted. The system 100 may include a melting vessel 110, a visbreaker unit 140 disposed downstream of the melting vessel 110, and a visbreaker effluent separation unit 170 downstream of the visbreaker unit 140. The visbreaker unit 140 may include a visbreaker furnace 150 and a soaker vessel 160 downstream of the visbreaker furnace 150. The system 100 may further include a stripping gas 130 that may be passed through the visbreaker furnace 150 and into fluid communication with the soaker vessel 160. Referring now to FIG. 2, in embodiments, the system 100 may further include a supercritical water system 200 disposed downstream of the visbreaker effluent separation unit 170. The system 100 may further include an SWU effluent separation system 250 downstream of the supercritical water system 200.

The system 100 may be used to conduct a process for converting the solid plastic waste 102 to liquid hydrocarbon oil. The processes of the present disclosure may include providing a feed comprising the solid plastic waste 102, melting the feed to produce a liquefied plastic stream 120, and visbreaking the liquefied plastic stream 120 in the visbreaker unit 140 comprising the visbreaker furnace 150 and the soaker vessel 160 downstream of the visbreaker furnace 150. The visbreaking may include heating the liquefied plastic stream 120 in the visbreaker furnace 150 to produce a heated liquefied plastic stream 126 having a temperature at which the plastic undergoes one or more chemical reactions to convert polymer molecules from the liquefied plastic stream 120 to one or more smaller molecules. The visbreaking may further comprise maintaining the heated liquefied plastic stream 126 at the visbreaker reaction temperature in the soaker vessel 160 for a residence time to produce a visbreaker effluent 166 and injecting the stripping gas 30 into the soaker vessel 160, where the stripping gas comprises at least one of steam, nitrogen, helium, argon, or combinations of these stripping gases. The visbreaking may further include introducing the stripping gas 130 to the liquefied plastic stream 120 upstream of the visbreaker furnace 150, the heated liquefied plastic stream 126 downstream of the visbreaker furnace 150, or both. The processes of the present disclosure may further include separating the visbreaker effluent 166 in a visbreaker effluent separation system 170 to produce the liquid hydrocarbon oil 172 and a lesser boiling effluent 174. The solid plastic waste 102 may comprise chlorine-containing plastics, and introducing the stripping gas 130 to the liquefied plastic stream 120, the heated liquefied plastic stream 126, or both upstream of the soaker vessel 160 may increase removal of chlorine from the heated liquefied plastic stream 126 in the soaker vessel 160 and may reduce the concentration of chlorine in the liquid hydrocarbon oil 172.

As used in the present disclosure, the term "reactor" refers to any vessel, container, or the like, in which one or more chemical reactions may occur between one or more reactants, optionally, in the presence of one or more catalysts. For example, a reactor may include a tank or tubular reactor configured to operate as a batch reactor, a continuous stirred-tank reactor (CSTR), or a plug flow reactor. Example reactors include packed bed reactors, such as fixed bed reactors, soaker vessel, ebullated bed reactors, plug flow reactors and reaction tubes, or other types of reactors. One or more "reaction zones" may be disposed within a reactor. As used in the present disclosure, the term "reaction zone" refers to a region or volume where a particular reaction takes place within a reactor. For example, a packed bed reactor with multiple catalyst beds may have multiple reaction zones, where each reaction zone is defined by the volume of each catalyst bed.

As used in the present disclosure, a "separation unit" refers to any separation device that at least partially separates one or more chemicals in a mixture from one another. For example, a separation unit may selectively separate different chemical species from one another, forming one or more chemical fractions. Examples of separation units include, without limitation, distillation columns, fractionators, flash drums, knock-out drums, knock-out pots, centrifuges, filtration devices, traps, scrubbers, expansion devices, membranes, solvent extraction devices, high-pressure separators, low-pressure separators, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition.

As used in this disclosure, the term "fractionation" may refer to a process of separating one or more constituents of a composition in which the constituents are divided from each other during a phase change based on differences in properties of each of the constituents. As an example, as used in this disclosure, "distillation" refers to separation of constituents of a liquid composition based on differences in the boiling point temperatures of constituents of a composition.

As used in this disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in the present disclosure, passing a stream or effluent from one unit "directly" to another unit may refer to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined.

As used in the present disclosure, the term "effluent" refers to a stream that is passed out of a reactor, a reaction zone, or a separation unit following a particular reaction or separation. Generally, an effluent has a different composition than the stream that entered the separation unit, reactor, or reaction zone. It should be understood that when an effluent is passed to another system unit, only a portion of that system stream may be passed. For example, a slip stream may carry some of the effluent away, meaning that only a portion of the effluent may enter the downstream system unit. The term "reaction effluent" may more particularly be used to refer to a stream that is passed out of a reactor or reaction zone.

It should further be understood that streams may be named for the components of the stream, and the component for which the stream is named may be the major component of the stream (such as comprising from 50 wt. %, from 70 wt. %, from 90 wt. %, from 95 wt. %, from 99 wt. %, from 99.5 wt. %, or from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "disulfide oil stream" passing to a first system component or from a first system component to a second system component should be understood to equivalently disclose "disulfide oil" passing to the first system component or passing from a first system component to a second system component.

The use of plastics in consumer, commercial, and industrial applications has become prolific. The increasing use of plastics worldwide has increased the generation of waste plastic, which presents a sustainability opportunity. Development of processes for converting waste plastics into reusable materials is continuing. Polyvinyl chloride (PVC) is one of the most abundant plastics used for consumable goods. PVC has relatively high abrasion resistance, mechanical strength, hardness, and durability, and it is also stable in various chemical environments. By adding a plasticizer, the PVC plastic can be highly flexible. Waste plastic can contain from 1 weight percent (wt. %) to 5 wt. % PVC. However, recycling of used PVC is very difficult due to the presence of chlorine in the structure. The chlorine content in PVC is generally from 50 wt. % to 60 wt. % based on the unit weight of the PVC. Incineration of PVC plastic waste generates highly toxic materials such as dioxin. Anaerobic pyrolysis also produces hydrochloric acid (HCl) and chloroaromatic compounds which are harmful to the environment. Thus, recycling plastic wastes containing PVC through pyrolysis is not preferred. An ongoing need exists for improved methods of recycling plastic wastes that include PVC plastic.

The visbreaker unit has been a common refining processes in conventional refineries for converting crude oil to greater value petrochemical products and intermediates. Visbreaking has traditionally been utilized for producing less viscous fuel oil from highly viscous residues. However, limited upgrading capability of the visbreaker unit makes it less attractive. In particular, recent refining processes are required to have substantial upgrading capability in converting heavy residue to light distillate while removing heteroatoms such as sulfur and metals. The visbreaker unit is not able to provide such capabilities due to the limited severity of the operation conditions. Thus, refineries are finding it more and more challenging to maintain utilization of visbreaker units in the refinery process. An ongoing need also exists for finding new ways to utilize existing visbreaker units in refinery complexes.

To address these issues, the present disclosure is directed to systems and processes for converting solid plastic wastes to liquid hydrocarbon oil through thermal or hydrothermal treatment conducted using a visbreaker unit. In particular, the systems and processes of the present disclosure may include melting the solid plastic waste to produce a liquefied plastic, visbreaking the liquefied plastic in the visbreaker unit to produce a visbreaker effluent, which comprises a liquid hydrocarbon oil, and passing a stripping gas through the liquefied plastic stream upstream of a soaker vessel of the visbreaker unit to facilitate removal of chlorine from the liquefied plastic prior to reaction to form the visbreaker effluent. The visbreaker effluent may be separated to produce the liquid hydrocarbon oil. The stripping gas introduced at various points in the visbreaker unit can help to dechlorinate the liquid plastic stream to remove chlorine and reduce the concentration of chlorine in the liquid hydrocarbon oil recovered from the process. Following visbreaking, the systems and processes of the present disclosure further may include upgrading the liquid hydrocarbon oil in a supercritical water treatment unit downstream of the visbreaker unit to produce an upgraded hydrocarbon oil. The liquid hydrocarbon oil or the upgraded liquid hydrocarbon oil can be suitable for use as a hydrocarbon feedstock for a steam cracking process, a hydrotreating process, or both, which can be used to further convert the hydrocarbon oil to greater value chemical products and intermediates.

The systems and processes of the present disclosure are operable to convert waste products, such as solid plastic waste, into a liquid hydrocarbon oil that can be further converted to more valuable liquid and gaseous petrochemical products by passing the liquid hydrocarbon oil to downstream converting processes such as a steam cracker, hydrotreating unit, or both. The systems and processes also provide a new alternative use for existing visbreaker systems that are already part of many refinery complexes. Further, introduction of the stripping gas at various points during the visbreaking process can dechlorinate the liquefied plastic waste, which can enable the processing of solid plastic wastes that contain PVC and other chlorinated plastics.

Referring again to FIG. 1, one embodiment of the system 100 for converting waste plastic to hydrocarbon oil may include a melting vessel 110, a visbreaker unit 140 disposed downstream of the melting vessel 110, and a visbreaker effluent separation system 170 downstream of the visbreaker unit 140. In embodiments, the system 100 may further include a plastic grinder 104 disposed upstream of the melting vessel 110. Referring to FIG. 2, in embodiments, the system 100 further can include the supercritical water system 200 disposed downstream of the visbreaker effluent separation system 170. The supercritical water system 200 can include a supercritical water unit 202 (SWU 202) and an SWU effluent separation system 250 disposed downstream of the SWU 202.

A process for converting the solid plastic waste to a liquid hydrocarbon oil with the system 100 may include providing a feed comprising the solid plastic waste 102, melting the solid plastic waste 102 in the melting vessel 110 to produce the liquefied plastic stream 120, and visbreaking the liquefied plastic stream 120 in the visbreaker unit 140 comprising the visbreaker furnace 150 and the soaker vessel 160 disposed downstream of the visbreaker furnace 150 to produce a visbreaker effluent 166. The visbreaking may include heating the liquefied plastic stream 120 in the visbreaker furnace 150 to produce a heated liquefied plastic stream 126 having a temperature at which the waste plastic undergoes one or more chemical reactions to convert polymer molecules from the liquefied plastic stream 120 to one or more smaller molecules, maintaining the heated liquefied plastic stream 126 at the visbreaker reaction temperature in the soaker vessel 160 for a residence time to produce a visbreaker effluent 166, and injecting a stripping gas 130 into the soaker vessel 160, where the stripping gas 130 comprises at least one of steam, nitrogen, helium, argon, or combinations of these stripping gases. The processes may further include introducing the stripping gas 130 to the liquefied plastic stream 120 upstream of the visbreaker furnace 150, the heated liquefied plastic stream 126 downstream of the visbreaker furnace 150, or both, and separating the visbreaker effluent 166 in a visbreaker effluent separation system 170 to produce the liquid hydrocarbon oil 172 and a lesser boiling effluent 174. The solid plastic waste 102 may include chlorine-containing plastics, such as but not limited to PVC. Introducing the stripping gas 130 to the liquefied plastic stream 120, the heated liquefied plastic stream 126, or both upstream of the soaker vessel 160 may increase removal of chlorine from the heated liquefied plastic stream 126 in the soaker vessel 160 and may reduce the concentration of chlorine in the liquid hydrocarbon oil 172.

The feed to the systems and processes of the present disclosure may comprise the solid plastic waste 102. The solid plastic waste 102 may include a single type of waste plastic or a combination of several different types of plastics, such as but not limited to polyolefins, polystyrenes, polyvinyl chlorides (PVC), polyethylene terephthalate (PET), composites of those polymers, or combinations of these. In embodiments, the solid plastic waste 102 may comprise one or more of polyolefins, polystyrenes, PVC, polyethylene terephthalate (PET), composites of these polymers, or combinations thereof. In embodiments, the solid plastic waste 102 may comprise one or more polymers selected from the group consisting of polyolefins, polystyrenes, PVC, polyethylene terephthalate (PET), composites of these polymers, and combinations of these polymers.

In embodiments, the solid plastic waste 102 may comprise one or more chlorine-containing plastics, such as but not limited to PVC. In embodiments, the solid plastic waste 102 may include from greater than 0 (zero) wt. % to 10 wt. % chlorine-containing plastic based on the unit weight of the solid plastic waste 102. In embodiments, the solid plastic waste 102 may comprise from 0 wt. % to 5 wt. %, from 0 wt. % to 4 wt. %, from 0.01 wt. % to 10 wt. %, from 0.01 wt. % to 5 wt. %, from 0.01 wt. % to 4 wt. %, from 0.1 wt. % to 10 wt. %, from 0.1 wt. % to 5 wt. %, from 0.1 wt. % to 4 wt. %, from 1 wt. % to 10 wt. %, from 1 wt. % to 5 wt. %, from 1 wt. % to 4 wt. %, from 2 wt. % to 10 wt. %, or from 2 wt. % to 5 wt. % chlorine-containing plastic based on the unit weight of the solid plastic waste 102. The solid plastic waste 102 may be collected and stored in a storage tank or storage bin (not shown). The solid plastic waste 102 may be pre-cleaned to remove metal parts and dirt, such as but not limited to dust, soil.

Referring again to FIG. 1, the system 100 may include a plastic grinder 104 or other device capable of chopping the solid plastic waste into smaller pieces. The plastic grinder 104 may be disposed upstream of the melting vessel 110 and may be operable to chop or grind the solid plastic waste 102 into smaller sizes to produce a chopped waste plastic 108. Chopping the solid plastic waste 102 into smaller sizes to produce the chopped waste plastic 108 may improve the efficiency of the melting vessel 110 at melting the solid plastic waste to produce the liquefied plastic stream 120. The processes of the present disclosure may include chopping the solid plastic waste 102 to produce the chopped waste plastic 108, which may have an average piece size of less than or equal to 50 millimeters (mm), such as less than or equal to 40 mm, less than or equal to 30 mm, less than or equal to 20 mm, less than or equal to 10 mm, or even less than or equal to 5 mm. Average piece size of the chopped waste plastic 108 may be from 0.1 mm to 50 mm, from 0.1 mm to 40 mm, from 0.1 mm to 30 mm, from 0.1 mm to 20 mm, from 0.1 mm to 10 mm, from 0.1 mm to 5 mm, from 1 mm to 50 mm, from 1 mm to 40 mm, from 1 mm to 30 mm, from 1 mm to 20 mm, from 1 mm to 10 mm, or from 1 mm to 5 mm.

Referring again to FIG. 1, the chopped waste plastic 108 may be passed to the melting vessel 110, which may be disposed downstream of the plastic grinder 104. In embodiments, the chopped waste plastic 108 may be passed directly from the plastic grinder 104 to the melting vessel 110. The melting vessel 110 may comprise a heated vessel in which the chopped waste plastic 108 is melted to produce the liquefied plastic stream 120. The internal volume of the melting vessel 110 may be determined from the required residence time of the chopped waste plastic 108 in the melting vessel 110 to produce the liquid plastic stream 120. In embodiments, the internal volume of the melting vessel 110 may be sufficient so that the residence time of the waste plastic in the melting vessel 110 is from 1 minute to 120 minutes, or from 10 minutes to 60 minutes.

The melting vessel 110 may include one or a plurality of internal or external heating elements to facilitate heating the waste plastic to melt the waste plastic. In embodiments, the melting vessel 110 may have one or more external heating elements, such as but not limited to a heating jacket, electrical heat tracing, insulation, or combinations of these. In FIG. 1, the melting vessel 110 is shown as having a heating jacket 112, however, it is understood that any other type of external heating element in combination with insulation may be utilized. Referring to FIG. 2, in embodiments, the melting vessel 110 may include an internal heating element 113, such as but not limited to an electric heating element or one or more heat transfer fluid tubes disposed in the internal volume of the melting vessel 110. Referring again to FIG. 1, the melting vessel 110 may include an internal agitator 114 disposed within the internal volume of the melting vessel 110. The internal agitator 114 may mix the chopped waste plastic 108 within the melting vessel 110, which may aid in distributing the heat uniformly throughout the melting vessel 110. The processes of the present disclosure may include mixing the solid plastic waste in the melting vessel 110 with the internal agitator 114, where the mixing distributes heat uniformly in the melting vessel 110.

The melting vessel 110 may be operated at a temperature and residence time sufficient to melt the chopped waste plastic 108 to produce the liquefied plastic stream 120. In embodiments, the melting vessel 110 may be operated at a temperature of from 120 degrees Celsius (° C.) to 270° C. In embodiments, the melting vessel 110 may be operated at a temperature of from 120° C. to 230° C., from 150° C. to 270° C., from 150° C. to 230° C., or from 230° C. to 270° C. The residence time of the waste plastic in the melting vessel 110 may be from 1 minute (min) to 120 min. In embodiments, the residence time of the waste plastic in the melting vessel 110 may be from 1 min to 60 min, from 10 min to 120 min, from 10 min to 60 min, or from 60 min to 120 min. The processes of the present disclosure may include melting the solid plastic waste in the melting vessel operated at a temperature of from 120° C. to 270° C., from 120° C. to 230° C., from 150° C. to 270° C., from 150° C. to 230° C., or from 230° C. to 270° C. to produce liquefied plastic stream.

Referring again to FIG. 1, in embodiments, an inert gas may be passed through the melting vessel 110 to remove oxygen from the melting vessel 110. The melting vessel 110 may include an inert gas inlet 115 operable to introduce an inert gas 116 to the internal volume of the melting vessel 110. The inert gas 116 may be a gas selected from the group consisting of nitrogen, argon, helium, and combinations of these gases. The inert gas 116 may have a concentration of oxygen that is less than or equal to 1 volume percent (vol. %) or even less than or equal to 0.2 vol. %. The melting vessel 110 may further include an exhaust gas outlet 117 operable to exhaust an exhaust gas 118 from the internal volume of the melting vessel 110. The exhaust gas 118 may include the inert gas 116 introduced to the melting vessel 110 as well as oxygen removed from the waste plastic by the flow of inert gas 116. In embodiments, the melting vessel 110 may further include an inert gas distributor 119 fluidly coupled to the inert gas inlet 115. The inert gas distributor 119 may be operable to distribute the inert gas 116 throughout the melting vessel 110. In embodiments, the inert gas distributor 119 may be a gas sparger. In embodiments, the processes of the present disclosure may include passing the inert gas 116 through the liquefied plastic and the solid plastic waste in the melting vessel 110 and exhausting the exhaust gas 118, which comprises at least the inert gas and oxygen, from the melting vessel, where a flow of the inert gas 116 through the liquefied plastic and the solid plastic waste in the melting vessel 110 may remove oxygen from the melting vessel 110.

Referring again to FIG. 1, the liquefied plastic stream 120 may be passed out of the melting vessel 110. The liquefied plastic stream 120 may have a temperature of from 120° C. to 270° C., from 120° C. to 230° C., from 150° C. to 270° C., from 150° C. to 230° C., or from 230° C. to 270° C. The liquefied plastic stream 120 may be passed from the melting vessel 110 to the visbreaker unit 140. In embodiments, the liquefied plastic stream 120 may be passed through a filtering unit (not shown) to remove any remaining solid material from the liquefied plastic stream 120. In embodiments, the liquefied plastic stream 120 may be passed to the visbreaker unit 140, such as to the visbreaker furnace 150 of the visbreaker unit 140, with a feed pump, an extruder, or both. In embodiments, the liquefied plastic stream 120 may be passed to the visbreaker furnace 150 with a feed pump 122, which may be a metering pump. Referring again to FIG. 2, in embodiments, the liquefied plastic stream 120 may be passed to the visbreaker furnace 150 by an extruder 123. As will be discussed subsequently in the present disclosure, in embodiments, the liquefied plastic stream 120 may be combined with a heated stripping gas 132 upstream of the visbreaker furnace 150 to produce a combined stream 124.

Referring again to FIG. 1, the liquefied plastic stream 120 or the combined stream 124 may be passed to the visbreaker unit 140. The visbreaker unit 140 may comprise the visbreaker furnace 150 and the soaker vessel 160 downstream of the visbreaker furnace 150. The visbreaker unit 140 may also include a stripping gas 130, which may be heated in the visbreaker furnace 150 and introduced to the soaker vessel 160. The stripping gas 130, after being heated, may also be combined with the liquefied plastic stream 120 upstream of the visbreaker furnace 150, the heated liquid plastic stream 126 downstream of the visbreaker furnace 150, or combinations of these, as will be further described in the present disclosure. The visbreaker unit 140 may be operable to break down the polymer chains of the waste plastic into smaller molecules to reduce viscosity and convert the waste plastic into a hydrocarbon oil that may be suitable for use as a hydrocarbon feedstock for steam cracking or hydrotreating. Additionally, the stripping gas 130 introduced to the visbreaker unit 140 may further aid in dechlorinating the polymer molecules in the heated liquefied plastic.

The visbreaker furnace 150 may include a convection section 152 and a radiation section 154. The convection section 152 and the radiation section 154 may be separated by a partition 156 so that the convection section 152 is out of sight of the radiation section 154. The visbreaker furnace 150 may include a gas-fired heater, an oil-fired heater, an electric furnace, or combinations of these. In embodiments, the convection section 152 may include a gas-fired heater, an oil-fired heater, an electric furnace, or combinations of these.

In embodiments, the radiation section 154 of the visbreaker furnace 150 may comprise an electric furnace. Heating the liquefied plastic stream 120 to a visbreaker reaction temperature may include passing the liquefied plastic stream 120 to the visbreaker furnace 150 comprising the convection section 152 and the radiation section 154 downstream of the convection section 152.

Materials, such as the liquefied plastic stream 120, the combined stream 124, the stripping gas 130, or both, may be heated in the visbreaker furnace 150 by passing the material through one or a plurality of tubes that pass through the convection section 152, the radiation section 154, or both. The liquefied plastic stream 120, with or without stripping gas, may be heated in the visbreaker furnace 150 by passing the liquefied plastic stream 120 through a tube 157 that passes through the convection section 152 and the radiation section 154 of the visbreaker furnace 150. In embodiments, the tube 157 may pass through the convection section 152 first followed by the radiation section 154. The tube 157 may be a single tube having a uniform inner diameter or a combination of tubes having different inner diameters. The inner diameter of the tube 157 may be determined by the average superficial velocity of a flow of the liquefied plastic stream 120 through the visbreaker furnace 150. In embodiments, the inner diameter of the tube 157 may be large enough to produce an average superficial velocity of a flow of the liquefied plastic stream 120 of greater than or equal to 0.1 meters per second, or even greater than or equal to 0.3 meters per second at the operating conditions of the visbreaker furnace 150. The operating conditions of the visbreaker furnace 150 that effect the average superficial velocity may include temperature, flow rate, and pressure. The average superficial velocity may also be effected by the mixing ratio of stripping gas to liquefied plastic stream 120 when the stripping gas is heated and introduced to the liquefied plastic stream 120 upstream of the visbreaker furnace 150, as will be described further detail in the present disclosure. In embodiments, the tube 157 may have an inner diameter of greater than or equal to 0.5 inches, or even greater than or equal to 1 inch. In embodiments, the tube 157 may have an inner diameter of from 0.5 inches to 15 inches, 0.5 inches to 10 inches, from 1 inch to 15 inches, or from 1 inch to 10 inches. In embodiments, the tube 157 may comprise a plurality of tubes and each of the plurality of tubes may have a cross-sectional area sufficient to produce the desired average superficial velocity of the liquefied plastic stream 120 through the tubes of greater than or equal to 0.1 meters per second, or greater than or equal to 0.3 meters per second.

The lengths of the tube 157 in each of the convection section 152 and the radiation section 154 of the visbreaker furnace 150 may be determined by the target residence time of the liquefied plastic of the liquefied plastic stream 120 in each of the convection section 152 and the radiation section 154. The temperatures of the liquefied plastic in the tube 157 may be controlled by the position of the tube 157 in the visbreaker furnace 150, the fuel flow rate to the convection section 152 of the visbreaker furnace 150, the power output of the electric furnace of the radiation section 154 of the visbreaker furnace 150, or combinations of these. The visbreaker furnace 150 may be operated at a temperature of from 150° C. to 650° C. The processes of the present disclosure may include operating the visbreaker furnace 150 at a temperature of from 150° C. to 650° C., such as from 150° C. to 550° C., from 200° C. to 650° C., from 200° C. to 550° C., from 250° C. to 650° C., or from 250° C. to 550° C. The liquefied plastic stream 120 or the combined stream 124 in the tube 157 may be maintained at a pressure of from 3 bar (300 kilopascals (kPa)) to 70 bar (7,000 kPa), from 3 bar (300 kPa) to 30 bar (3,000 kPa), from 8 bar (800 kPa) to 70 bar (7,000 kPa), or from 8 bar (800 kPa) to 30 bar (3,000 kPa).

The liquefied plastic stream 120 may be heated to an intermediate temperature in the convection section 152 of the visbreaker furnace 150. In embodiments, the liquefied plastic stream 120 may have an intermediate temperature of from 150° C. to 350° C. at a point 158 at the exit from the convection section 152 of the visbreaker furnace 150. In embodiments, the intermediate temperature of the liquefied plastic stream 120 at the point 158 at the exit of the convection section 152 may be from 150° C. to 300° C., from 175° C. to 350° C., or even from 175° C. to 300° C. A residence time of the liquefied plastic stream 120 in the convection section 152 of the visbreaker furnace 150 may be from 5 minutes to 30 minutes.

At point 158, the tube 157 may pass from the convection section 152 to the radiation section 154. The radiation section 154 may continue to heat the liquefied plastic stream 120 or combined stream 124 to the visbreaker reaction temperature of the visbreaker unit 140. The temperature of the heated liquefied plastic stream 126 exiting the radiation section 154 of the visbreaker furnace 150 at point 159 may be from 250° C. to 450° C. In embodiments, a temperature of the heated liquefied plastic stream 126 exiting the radiation section 154 of the visbreaker furnace 150 at point 159 may be from 250° C. to 400° C. from 250° C. to 350° C., from 300° C. to 450° C., from 300° C. to 400° C., from 300° C. to 350° C., or from 350° C. to 450° C. A residence time of the liquefied plastic stream in the radiation section 154 of the visbreaker furnace 150 may be from 5 minutes to 30 minutes. A pressure of the heated liquefied plastic stream 126 at the point 159 at the exit from the radiation section 154 of the visbreaker furnace 150 may be from 3 bar (300 kilopascals (kPa)) to 70 bar (7,000 kPa), from 3 bar (300 kPa) to 30 bar (3,000 kPa), from 8 bar (800 kPa) to 70 bar (7,000 kPa), or from 8 bar (800 kPa) to 30 bar (3,000 kPa).

Referring again to FIG. 1, in embodiments, a stripping gas 130 may be heated in the convection section 152 of the visbreaker furnace 150 to produce a heated stripping gas 132. The stripping gas 130 may be passed through the convection section 152 of the visbreaker furnace 150 through stripping gas tube 131.

Referring again to FIG. 1, the heated liquefied plastic stream 126 may be passed from the visbreaker furnace 150 to the soaker vessel 160 disposed downstream of the visbreaker furnace 150. The soaker vessel 160 may maintain the heated liquefied plastic stream 126 at the visbreaker reaction temperature of from 250° C. to 450° C. for a residence time sufficient to break the polymer molecules of the waste plastics into smaller molecules to produce a visbreaker effluent 166 comprising a hydrocarbon oil. Any chlorine-containing plastics in the liquefied plastic may be dechlorinated in the soaker vessel 160 by introduction of the heated stripping gas 132 to the soaker vessel 160.

The soaker vessel 160 may be an insulated vessel having an internal volume sufficient to provide a residence time of the heated liquefied plastic at the visbreaker reaction temperature of from 5 minutes to 60 minutes. The insulation may reduce heat transfer through the walls of the soaker vessel 160 to aid in maintaining the heated liquefied plastic at the visbreaker reaction temperature. In embodiments, the soaker vessel 160 may include an internal heating device, an external heating device, or both to maintain the heated liquefied plastic at the visbreaker reaction temperature. In embodiments, the soaker vessel 160 may include an agitator (not shown) operable to mix the contents of the soaker vessel 160, which may aid in maintaining a homogeneous temperature distribution throughout the soaker vessel 160. The soaker vessel 160 may comprise a heated liquefied plastic inlet 162, which may be in fluid communication with an outlet of the visbreaker furnace 150. The soaker vessel 160 may further include an effluent outlet 164 that may be operable to pass the visbreaker effluent 166 out of the soaker vessel 160. In embodiments, the soaker vessel 160 may be a soaker drum of an existing visbreaker in a refinery.

The soaker vessel 160 may be operated at a temperature of from 250° C. to 450° C., such as from 250° C. to 400° C. from 250° C. to 350° C., from 300° C. to 450° C., from 300° C. to 400° C., from 300° C. to 350° C., or from 350° C. to 450° C. A residence time of the heated liquefied plastic from the heated liquefied plastic stream 126 in the soaker vessel 160 may be from 5 minutes to 60 minutes. The processes of the present disclosure may include maintaining a temperature of the soaker vessel 160 at the visbreaker reaction temperature of from 300° C. to 450° C. using an external heater, an internal heater, insulation, or a combination of these. The processes of the present disclosure may include passing the visbreaker effluent 166 out of the soaker vessel 160.

Referring again to FIG. 1, a stripping gas 130 may be introduced to the visbreaker unit 140 to facilitate dechlorination of the waste plastics during visbreaking. The stripping gas 130 may include steam, nitrogen, helium, argon, or combinations of these. When the stripping gas 130 comprises steam, the steam may be low pressure steam, medium pressure steam, or high pressure steam. The stripping gas 130 may have a pressure of from 3 bar (300 kPa) to 70 bar (7,000 kPa), from 3 bar (300 kPa) to 30 bar (3,000 kPa), from 8 bar (800 kPa) to 70 bar (7,000 kPa), or from 8 bar (800 kPa) to 30 bar (3,000 kPa).

As previously discussed, the stripping gas 130 may be heated in the convection section 152 of the visbreaker furnace 150 to produce a heated stripping gas 132. The heated stripping gas 132 may be passed from the visbreaker furnace 150 to the soaker vessel 160 through stripping gas line 142. The temperature of the heated stripping gas 132 in the stripping gas line 142 may be from 300° C. to 400° C. The heated stripping gas 132 may be introduced to the soaker vessel 160 in co-current or countercurrent flow relative to the direction of flow of the heated liquefied plastic stream 126 through the soaker vessel 160. The heated stripping gas 132 may be introduced to the soaker vessel 160 at a gas hourly space velocity (GHSV) of from 10 per hour to 100 per hour, where the GHSV is defined as the volume flow rate of the heated stripping gas 132 divided by the total internal volume of the soaker vessel 160.

The heated stripping gas 132 may facilitate dechlorination of chlorine-containing plastics, such as but not limited to PVC plastics, in the liquefied plastic, such as by removing chlorine from the polymer structures of the chlorine-containing plastics. The dechlorination process in the soaker vessel 160 may comprise a thermal dechlorination process, a hydrothermal dechlorination process, or both. In embodiments, the stripping gas 130 may be a dry stripping gas, which may consist essentially of nitrogen, helium, argon, or combinations of these. When the stripping gas 130 is a dry stripping gas, the stripping gas does not include steam. When the stripping gas 130 is a dry stripping gas, the dechlorination of the liquefied plastic may proceed generally through a thermal dechlorination mechanism. Without being bound by any particular theory, it is believed that thermal dechlorination may proceed through an ionic chain reaction conducted at the visbreaker reaction temperature in the soaker vessel 160, where the ionic chain reaction removes chloride ions from the chloride-containing plastics in the liquefied plastic to produce polyenes and hydrochloric acid. The polyenes may be broken down further into smaller molecules by the visbreaking process. In embodiments, the stripping gas 130 may be a dry stripping gas consisting essentially of nitrogen, helium, argon, or combinations of these, and maintaining the heated liquefied plastic stream 126 at the visbreaker reaction temperature of from 300° C. to 450° C. in the soaker vessel 160 may cause thermal dechlorination of chloride-containing plastics in the heated liquefied plastic stream 126, where thermal dechlorination comprises an ionic chain reaction that removes chloride ions from the chloride-containing plastics to produce polyenes and hydrochloric acid.

In embodiments, the stripping gas 130 may include steam (vapor phase water). When the stripping gas 130 comprises steam, the dechlorination of the liquefied plastic may proceed through thermal dechlorination and hydrothermal dechlorination. Without being bound by any particular theory, it is believed that hydrothermal dechlorination may proceed through a nucleophilic substitution reaction in which the chloride groups on the chlorine-containing plastics are substituted with hydroxyl groups provided by the steam to produce polyols and hydrochloric acid. The polyols may further react in the soaker vessel to break down into smaller molecules, such as but not limited to aromatic compounds or lower molecular weight hydrocarbons. Thermal dechlorination through the ionic chain reaction mechanism may also occur in the soaker vessel 160 when the stripping gas comprises steam. In embodiments, the heated stripping gas 132 introduced to the soaker vessel 160 may comprise steam, and maintaining the heated liquefied plastic stream 126 at the visbreaker reaction temperature of from 300° C. to 450° C. in the soaker vessel 160 may cause hydrothermal dechlorination of chloride-containing plastics in the heated liquefied plastic stream 126, where hydrothermal dechlorination comprises nucleophilic substitution of chloride ions from in the chloride-containing plastics with hydroxyl groups from the steam to produce polyols and hydrochloric acid.

In embodiments, the stripping gas 130, heated stripping gas 132, or both may comprise steam and one or more of an inert gas selected from nitrogen, helium, argon, or combination of these. Maintaining the heated liquefied plastic stream 126 at the visbreaker reaction temperature of from 300° C. to 450° C. in the soaker vessel 160 may cause thermal dechlorination and hydrothermal dechlorination of chloride-containing plastics in the heated liquefied plastic stream 126. Dechlorination of the heated liquefied plastic stream 126 in the soaker vessel 160 may produce a liquid hydrocarbon oil 172 having a chlorine content of less than or equal to 1000 parts per million by weight (ppmw), or even less than or equal to 500 ppmw.

Referring again to FIG. 1, dechlorination of the liquefied waste plastic may be enhanced or accelerated by introducing the stripping gas 130 to the liquefied waste plastic upstream of the soaker vessel 160. As previously discussed, the stripping gas 130 may include steam, nitrogen, helium, argon, or combinations of these. In embodiments, the stripping gas 130, after being heated in the visbreaker furnace 150, may be introduced to the liquefied plastic stream 120 between the melting vessel 110 and the visbreaker furnace 150, to the heated liquefied plastic stream 126 between the visbreaker furnace 150 and the soaker vessel 160, or both.

The stripping gas 130, after heating in the visbreaker furnace 150, may dilute the liquefied plastic and may improve dechlorination of the chlorine-containing plastics by starting the dechlorination reactions upstream of the soaker vessel 160, which may increase the residence time for dechlorination. As previously discussed, dechlorination removes chloride ions from the chlorine-containing plastics in the liquefied plastic which results in a reduction in the chlorine content of the liquid hydrocarbon oil 172 recovered from the visbreaker effluent 166.

In embodiments, the stripping gas 130 may be introduced to the heated liquefied plastic stream 126 between the visbreaker furnace 150 and the soaker vessel 160. As previously discussed, the stripping gas 130 may be preheated in the visbreaker furnace 150 to produce the heated stripping gas 132. As previously discussed, the heated stripping gas 132 may have a temperature of from 250° C. to 400° C., such as from 250° C. to 350° C. The heated stripping gas 132 may have a pressure of from 3 bar (300 kPa) to 70 bar (7,000 kPa), from 3 bar (300 kPa) to 30 bar (3,000 kPa), from 8 bar (800 kPa) to 70 bar (7,000 kPa), or from 8 bar (800 kPa) to 30 bar (3,000 kPa). The heated stripping gas 132 may be introduced to the heated liquefied plastic stream 126 at a point 134 that is downstream of the point 159 at the exit of the radiation section 154 of the visbreaker furnace 150 and upstream of the inlet 162 of the soaker vessel 160. The heated stripping gas 132 may be divided downstream of the convection section 152 of the visbreaker furnace 150. A first portion of the heated stripping gas 132 may be passed directly to the soaker vessel 160 through line 142, and a second portion of the heated stripping gas 132 may be passed through line 144 to point 134 upstream of the soaker vessel 160, between the visbreaker furnace 150 and the soaker vessel 160. In embodiments, the first portion of the heated stripping gas 132 in line 142 and the second portion of the heated stripping gas 132 in line 144 may have the same temperature and pressure. Introducing the heated stripping gas 132 to the heated liquefied plastic stream 126 upstream of the soaker vessel 160 may produce a heated combined stream 138, which may then be passed to the soaker vessel 160. Introducing the heated stripping gas 132 to the heated liquefied plastic stream 126 upstream of the soaker vessel 160 may start the dechlorination reactions within the heated liquefied plastic stream 126 upstream of the soaker vessel 160.

When the heated stripping gas 132 is introduced to the heated liquefied plastic stream 126 between the visbreaker furnace 150 and the soaker vessel 160, a volume flow rate of the heated stripping gas 132 introduced to the heated liquefied plastic stream 126 may be sufficient to enhance dechlorination of the chlorine-containing plastics upstream of the soaker vessel 160. Enhancing dechlorination of the chlorine-containing plastics refers to increasing the rate of dechlorination of the chlorine-containing plastics. In embodiments, the volume flow rate of the heated stripping gas 132 introduced to the heated liquefied plastic stream 126 may be sufficient so that the heated combined stream 138 has a volume flow ratio of the heated stripping gas 132 to the heated liquefied plastic stream 126 is from 0.02 to 5, from 0.02 to 0.5, from 0.05 to 5, or from 0.05 to 0.5. The volume flow ratio of the heated combined stream 138 is equal to the volume flow rate of the heated stripping gas 132 in line 144 divided by the volume flow rate of the heated liquefied plastic stream 126.

Referring again to FIG. 1, in embodiments, the stripping gas 130, after heating in the convection section 152 of the visbreaker furnace 150, may be introduced to the liquefied plastic stream 120 upstream from the visbreaker furnace 150, such as at point 136 disposed downstream of the outlet from the melting vessel 110 and the inlet to the convection section 152 of the visbreaker furnace 150. When the stripping gas 130 is introduced to the liquefied plastic stream 120 upstream of the visbreaker furnace 150, the stripping gas 130 may require less heating compared to the heated stripping gas 132 introduced directly to the soaker vessel 160 or introduced to the heated liquefied plastic stream 126 between the visbreaker furnace 150 and the soaker vessel 160. In embodiments, the stripping gas tube 131 may have a branch 131A such that the stripping gas 130 is divided into two separate streams in or upstream of the convection section 152 of the visbreaker furnace 150. The branch 131A may provide a shorter path through the convection section 152 to provide a secondary heated stripping gas 133 having a temperature less than the temperature of the heated stripping gas 132 passed to the soaker vessel 160.

The secondary heated stripping gas 133 may have a temperature of from 120° C. to 270° C., from 120° C. to 230° C., from 150° C. to 270° C., or from 150° C. to 230° C. The secondary heated stripping gas 133 may have a pressure of from 3 bar (300 kPa) to 70 bar (7,000 kPa), from 3 bar (300 kPa) to 30 bar (3,000 kPa), from 8 bar (800 kPa) to 70 bar (7,000 kPa), or from 8 bar (800 kPa) to 30 bar (3,000 kPa). In embodiments, the processes of the present disclosure may comprise introducing the stripping gas, such as the secondary heated stripping gas 133, to the liquefied plastic stream 120 between the outlet of the melting vessel 110 and the inlet to the visbreaker furnace 150. The secondary heated stripping gas 133 may be passed through line 146 from the convection section 152 of the visbreaker furnace 150 to point 136 at which the secondary heated stripping gas 133 is combined with the liquefied plastic stream 120. A combined stream 124 comprising the combination of the liquefied plastic stream 120 and the secondary heated stripping gas 133 may then be passed to the convection section 152 of the visbreaker furnace 150. Introducing the secondary heated stripping gas 133 to the liquefied plastic stream 120 upstream of the visbreaker furnace 150 may enhance the dechlorination reactions during heating of the liquefied plastic stream 120 in the visbreaker furnace 150, which may provide further residence time for the dechlorination reactions to take place.

When the stripping gas 130, such as secondary heated stripping gas 133, is introduced to the liquefied plastic stream 120 upstream from the visbreaker furnace, a volume flow rate of the secondary heated stripping gas 133 introduced to the liquefied plastic stream 120 may be sufficient to enhance dechlorination of the chlorine-containing plastics upstream of the soaker vessel 160. In embodiments, the volume flow rate of the secondary heated stripping gas 133 introduced to the liquefied plastic stream 120 may be such that the combined stream 124 has a volume flow ratio of the secondary heated stripping gas 133 to the liquefied plastic stream 120 is from 0.02 to 5, from 0.02 to 0.5, from 0.05 to 5, or from 0.05 to 0.5. The volume flow ratio of the combined stream 124 is equal to the volume flow rate of the secondary heated stripping gas 133 in line 146 divided by the volume flow rate of the liquefied plastic stream 120.

In embodiments, the stripping gas 130 may be introduced to both the liquefied plastic stream 120 at point 136 upstream of the visbreaker furnace 150 and to the heated liquefied plastic stream 126 at point 134 between the visbreaker furnace 150 and the soaker vessel 160. In particular, the processes may include introducing the heated stripping gas 132 to the heated liquefied plastic stream 126 at the point 134 between the visbreaker furnace 150 and the soaker vessel 160 and introducing the secondary heated stripping gas 133 to the liquefied plastic stream 120 at the point 136 upstream of the visbreaker furnace 150. When the stripping gas 130 is added to both the liquefied plastic stream 120 and the heated liquefied plastic stream 126, the total volume flow rate of the stripping gas 130 added upstream of the soaker vessel 160 may be a volume flow rate that results in a total volume flow ratio of the stripping gas 130 to the liquefied plastic of from 0.02 to 5, from 0.02 to 0.5, from 0.05 to 5, or from 0.05 to 0.5. The total volume flow ratio in these embodiments is equal to the total volume flow rate of the stripping gas 130 introduced upstream of the soaker vessel 160 divided by the volume flow rate of the liquefied plastic to the visbreaker unit 140. The total volume flow rate of the stripping gas 130 introduced upstream of the soaker vessel 160 is equal to the sum of the volume flow rate of the secondary stripping gas 133 combined with the liquefied plastic stream 120 and the volume flow rate of the portion of the heated stripping gas 132 combined with the heated liquefied plastic stream 126. The total volume flow rate of the stripping gas 130 introduced upstream of the soaker vessel 160 does not include the portion of the heated stripping gas 132 passed directly to the soaker vessel 160. The volume flow rate of the liquefied plastic to the visbreaker unit 140 refers to the volume flow rate of the liquefied plastic stream 120 before introducing the secondary heated stripping gas 133. In embodiments, when the stripping gas 130 is added to both the liquefied plastic stream 120 and the heated liquefied plastic stream 126 upstream of the soaker vessel 160, the volume flow rate of the secondary heated stripping gas 133 introduced to the liquefied plastic stream 120 upstream of the visbreaker furnace 150 may be greater than the volume flow rate of the heated stripping gas 132 introduced to the heated liquefied plastic stream 126 between the visbreaker furnace 150 and the soaker vessel 160.

As previously discussed, visbreaking the liquefied plastic stream 120 in the visbreaker unit 140 may breakdown polymer molecules from the plastics and dechlorinate chlorine-containing plastics to produce a visbreaker effluent 166, which may be passed out of the soaker vessel 160. The visbreaker effluent 166 may include hydrocarbons produced from visbreaking the polymer molecules of the liquefied plastic stream 120. The hydrocarbons in the visbreaker effluent 166 may have an average molecular weight that is less than an average molecular weight of the hydrocarbons in the liquefied plastic stream 120. The visbreaker effluent 166 may further include gases, such as but not limited to inert gases included in the stripping gas 130, any light hydrocarbon gases resulting from visbreaking, chlorine-containing gases produced through dechlorination of the chlorine-containing plastics, steam, or combinations of these.

The visbreaker effluent 166 may be passed to the visbreaker effluent separation system 170, which may be disposed downstream of the soaker vessel 160. The visbreaker effluent separation system 170 may include one or a plurality of separation units operable to separate the visbreaker effluent 166 to produce a liquid hydrocarbon oil 172 and a lesser boiling effluent 174. The processes of the present disclosure may include passing the visbreaker effluent 166 to the visbreaker effluent separation system 170 that separates the visbreaker effluent 166 to produce the liquid hydrocarbon oil 172 and the lesser boiling effluent 174. In embodiments, the visbreaker effluent separation system 170 may comprise a separation column, such as but not limited to a flash column, a fractionation column, or a combination of these separation columns. In embodiments, the visbreaker effluent separation system 170 may be a flash column. In embodiments, the visbreaker effluent separation system 170 may be operated at a temperature of less than or equal to 450° C., such as from 75° C. to 450° C. In embodiments, the visbreaker effluent separation system 170 may be operable to separate the visbreaker effluent 166 according to differences in boiling point temperature and may have a separation temperature of less than or equal to 450° C., such as from 75° C. to 450° C.

The lesser boiling effluent 174 may include light gases and steam from the visbreaker effluent 166. In embodiments, the lesser boiling effluent 174 may include water vapor, inert gases from the stripping gas 130, and light hydrocarbons and chlorine-containing gases produced in the visbreaker unit. The light hydrocarbons may include hydrocarbons having from 1 to 6 carbons atoms, such as but not limited to methane, ethane, ethylene, acetylene, propane, propylene, butanes, butenes, butynes, pentanes, pentenes, pentynes, hexanes, hexenes, hexynes, or other light hydrocarbons. In embodiments, the lesser boiling effluent 174 may include greater than or equal to 95%, greater than or equal to 98%, greater than or equal to 99%, or even greater than or equal to 99.9% of the hydrocarbons from the visbreaker effluent having from 1 to 6 carbon atoms by weight or by mole. The chlorine-containing compounds in the lesser boiling effluent 174 may include but are not limited to hydrogen chloride, chlorine gas, chloroalkanes, or combinations of these. Chloroalkanes may include, but are not limited to methyl chloride, dichloromethane, trichloromethane, tetrachloromethane, chloroethanes, chloropropanes, or other chlorinated alkanes. In embodiments, the lesser boiling effluent 174 may include greater than or equal to 95%, greater than or equal to 98%, greater than or equal to 99%, greater than 99.9%, or even greater than or equal to 99.99% of the chlorine-containing compounds from the visbreaker effluent 166, by weight or by mole.

The lesser boiling effluent 174 may include water vapor, which may include residual steam introduced to the visbreaker unit 140 in the stripping gas 130 and any water produced by reactions in the visbreaker unit 140. The lesser boiling effluent may include greater than or equal to 95%, greater than or equal to 98%, greater than or equal to 99%, or even greater than or equal to 99.9% of the water from the visbreaker effluent, by weight or by mole. In embodiments, the lesser boiling effluent 174 may further include any inert gases introduced to the melting vessel 110 or to the visbreaker unit 140 in the stripping gas 130. The inert gases may include nitrogen, argon, helium, or combinations of these. The lesser boiling effluent 174 may include greater than or equal to 95%, greater than or equal to 98%, greater than or equal to 99%, or even greater than or equal to 99.9% of the inert gases from the visbreaker effluent 166, by weight or by mole. The lesser boiling effluent 174 may be passed to one or more downstream treatment processes, such as processes to remove chlorine containing compounds; processes to recover steam, inert gases, or both from the lesser boiling effluent 174; processes to recover light hydrocarbons for fuel gas or combination with other refinery stream; or combinations of these.

The liquid hydrocarbon oil 172 may include the constituents from the visbreaker effluent 166 having boiling point temperatures greater than the separation temperature in the visbreaker effluent separation system 170. In embodiments, the liquid hydrocarbon oil 172 may include greater than or equal to 95%, greater than or equal to 98%, greater than or equal to 99%, or even greater than or equal to 99.9% of constituents from the visbreaker effluent 166 having boiling point temperatures greater than or equal to 450° C., by weight or by mole. In embodiments, the liquid hydrocarbon oil 172 may include greater than or equal to 90%, greater than or equal to 95%, greater than or equal to 98%, or even greater than or equal to 99% of constituents from the visbreaker effluent 166 having boiling point temperatures greater than or equal to 120° C., by weight or by mole.

The liquid hydrocarbon oil 172 passed out of the visbreaker effluent separation system 170 may have a pressure between 102 kPa and 304 kPa. In embodiments, the liquid hydrocarbon oil 172 passed out of the visbreaker effluent separation system 170 may have a kinematic viscosity of from 0.1 centistokes (cSt) to 2,000 cSt measured at 100° C., such as from 0.1 cSt to 600 cSt, from 0.1 cSt to 500 cSt, from 0.1 cSt to 100 cSt, from 1 cSt to 2000 cSt, from 1 cSt to 600 cSt, from 1 cSt to 500 cSt, from 1 cSt to 100 cSt, from 50 cSt to 2000 cSt, from 50 cSt to 600 cSt, from 50 cSt to 500 cSt, from 50 cSt to 100 cSt, from 100 cSt to 2000 cSt, from 100 cSt to 600 cSt, or from 100 cSt to 500 cSt measured at 100° C. The kinematic viscosity of the liquid hydrocarbon oil 172 may be determined according to the standard test method in ASTM D7042. In embodiments, the liquid hydrocarbon oil 172 may have a chlorine content of less than or equal to 1000 parts per million by weight (ppmw), or even less than or equal to 500 ppmw, based on the total weight of the liquid hydrocarbon oil 172 passed out of the visbreaker effluent separation system 170. The liquid hydrocarbon oil 172 may have a kinematic viscosity, chlorine content, and hydrogen content that may make the liquid hydrocarbon oil 172 suitable for use as a hydrocarbon feed to a steam cracking process or a hydrotreating process.

However, in some instances, the liquid hydrocarbon oil 172 produced through visbreaking alone may not be sufficiently light for being used as a hydrocarbon feed to a steam cracking process or a hydrotreating process. In particular, ethylene yield from a steam cracking process is directly related to the hydrogen content of feed hydrocarbons. In some instances, the liquid hydrocarbon oil 172 produced from visbreaking alone may not have a hydrogen content high enough to produce an acceptable yield of ethylene through steam cracking. The hydrogen content of the liquid hydrocarbon oil 172 may be added through hydrotreating. However, it can be more difficult to treat the liquid hydrocarbon oil 172 in a hydrotreating process directly because the liquid hydrocarbon oil 172 may have a low concentration of light hydrocarbons compared to other hydrocarbon feeds for hydrotreating processes. Increasing the hydrogen content of the liquid hydrocarbon oil 172 through hydrotreating would require hydrocracking under severe conditions with large quantities of hydrogen at high pressure, which is expensive. Thus, it may not be practical or economical to hydrotreat the liquid hydrocarbon oil 172 directly in a hydrotreating process when the liquid hydrocarbon oil 172 has a lower hydrogen content.

The liquid hydrocarbon oil 172 can be upgraded to increase the content of light hydrocarbons quickly through high temperature pyrolysis at 500° C. and residence time of less than 3 hours. However, the resulting effluent can contain a substantial amount of gases, which have a lesser value compared to the liquid products. To increase the conversion of the liquid hydrocarbon oil 172 to liquid products relative to gas products, the pyrolysis temperature can be reduced to less than or equal to 450° C. However, at these pyrolysis temperatures, the residence time to reach the desired conversion would be considerably longer, such as greater than or equal to 6 hours. Therefore, upgrading the liquid hydrocarbon oil 172 through pyrolysis to increase light hydrocarbon content may not be economical or practical.

Referring now to FIG. 2, the processes of the present disclosure may include a supercritical water system 200 that may be operable to upgrade the liquid hydrocarbon oil 172 to produce an upgraded hydrocarbon oil 252 having a light hydrocarbon content greater than the liquid hydrocarbon oil 172. The upgraded hydrocarbon oil 252 may be used directly as a hydrocarbon feed to a steam cracking process or a hydrotreating process. In particular, the processes of the present disclosure may include contacting the liquid hydrocarbon oil 172 with supercritical water 204 in a supercritical water unit 202 at a pressure of from 22,000 kPag to 30,000 kPag and a temperature of from 374° C. to 600° C., where the contacting the liquid hydrocarbon oil 172 with the supercritical water 204 may increase the light hydrocarbon content of the liquid hydrocarbon oil 172 to produce an supercritical water unit (SWU) effluent 232 comprising an upgraded hydrocarbon oil 252.

Supercritical water treatment of the polymer molecules in the liquid hydrocarbon oil may result in further depolymerization to produce oily hydrocarbons with high liquid yield. The role of supercritical water is to facilitate radical-mediated dissociation of polymer chains and removal of the resulting hydrocarbons, which are produced by the dissociation, into the supercritical water medium. Through such a fast separation of cracked products from the polymer chains, inter-radical reactions, which can result in formation of aromatic compounds and eventually coke, can be suppressed. Also, supercritical water acts as an efficient heat transfer medium for the reaction.

Referring again to FIG. 2, the liquid hydrocarbon oil 172 may be passed from the visbreaker effluent separation system 170 to the supercritical water system 200. In embodiments, the liquid hydrocarbon oil 172 may be passed directly to the supercritical water system 200. In embodiments, the liquid hydrocarbon oil 172 may be passed to a surge vessel or storage vessel (not shown) and then passed from the surge vessel or storage vessel to the supercritical water system 200. In embodiments, the liquid hydrocarbon oil 172 may be transferred to the supercritical water system 200 using a metering pump 206. The pressure of the liquid hydrocarbon oil 172 downstream of the metering pump 206 may be from 22,000 kPa to 30,000 kPa. The liquid hydrocarbon oil 172 may be maintained at a temperature of greater than 150° C., such as from 150° C. to 450° C., and a pressure of from 22,000 kPa to 30,000 kPa, after pumping, while passing the liquid hydrocarbon oil 172 to the supercritical water system 200. The transfer line passing the liquid hydrocarbon oil 172 to the supercritical water system 200 may be heat traced to maintain the temperature of the liquid hydrocarbon oil 172 greater than or equal to 150° C.

The system 100 may further include a filter 208, which may be disposed upstream or downstream of the metering pump 206. The filter 208 may be operable to remove any solid materials from the liquefied hydrocarbon oil 172 upstream of the supercritical water system 200. In embodiments, the processes of the present disclosure can include filtering the liquid hydrocarbon oil 172 upstream of the supercritical water system 200.

Referring to FIG. 2, the supercritical water system 200 may include a supercritical water unit (SWU) 202, a heat exchanger 240 disposed downstream of the SWU 202, and the SWU effluent separation system 250 downstream of the heat exchanger 240. In embodiments, the SWU 202 may comprise an SWU furnace 210, a mixing unit 220 upstream of the SWU furnace 210 having a convection section 212 and a radiation section 214, and a tubular reactor 230 downstream of the mixing unit 220. At least a portion of the tubular reactor 230 may pass through the convection section 212 of the SWU furnace 210 to heat the tubular reactor 230. In embodiments, the processes of the present disclosure may include contacting the liquid hydrocarbon oil 172 with the supercritical water 204 in the SWU 202. Contacting the liquid hydrocarbon oil 172 with the supercritical water 204 may include passing the liquid hydrocarbon oil 172 to the SWU 202, mixing the liquid hydrocarbon oil 172 with the supercritical water 204 in the mixing unit 220 to produce a supercritical water reaction mixture 222, and maintaining the temperature and pressure of the supercritical water reaction mixture 222 for a residence time sufficient to increase the light hydrocarbon content of the liquid hydrocarbon oil 172 to produce the SWU effluent 232, which can be further separated to produce the upgraded hydrocarbon oil 252, a gaseous product 254, and supercritical water.

Water may be introduced to the SWU 202 through pressurized water stream 216 and heated in the SWU furnace 210 to produce the supercritical water 204. The water of the pressurized water stream 216 may be a demineralized water having an electrical conductivity of less than or equal to 10 microsiemens per centimeter (µS/cm), such as from 0 (zero) µS/cm to 10 µS/cm. The water of the pressurized water stream 216 may have a concentration of sodium of less than or equal to 10 micrograms per liter (µg/L), such as from 0 (zero) µg/L to 10 µg/L. The water may have a concentration of silica of less than or equal to 6 µg/L, such as from 0 (zero) µg/L to 6 µg/L. The pressure of the pressurized water stream 216 may be from 22,000 kPa (220 bar) to 30,000 kPa (bar). The pressurized water stream 216 may be fed to the SWU 202 using a metering pump 217. The flow rate of the pressurized water stream 216 may be controlled so that a mass flow ratio of the water to liquid hydrocarbon oil passed to the SWU 202 is from 0.1 to 50, such as from 0.1 to 25, from 0.1 to 20, from 0.1 to 5, from 1 to 50, from 1 to 25, from 1 to 10, from 1 to 5, from 5 to 50, from 5 to 25, or from 5 to 10. The mass flow ratio of water to liquid hydrocarbon oil is equal to the mass flow rate of the pressurized water stream 216 to the SWU 202 divided by the mass flow rate of the liquid hydrocarbon oil 172 passed to the SWU 202. In particular, the mass flow ratio of water to liquid hydrocarbon oil may be equal to the mass flow rate of the supercritical water 204 to the mixing unit 220 divided by the mass flow rate of the liquid hydrocarbon oil 172 to the mixing unit 220.

The pressurized water stream 216 may be heated in the SWU furnace 210 to produce the supercritical water 204. The SWU furnace 210 may comprise a gas-fired heater, a fuel oil fired heater, an electric heater, or combinations of these. The SWU furnace 210 may include a convection section 212 and a radiation section 214. In embodiments, the convection section 212 of the SWU furnace 210 may be separated from the radiation section 214 by a partition, where the convection section 212 is out-of-sight of the radiation section 214. The pressurized water stream 216 may be preheated by passing the pressurized water stream 216 through the radiation section 214 of the SWU furnace 210 to produce the supercritical water 204 at the exit from the radiation section 214.

The supercritical water 204 may have a temperature of greater than or equal to 374° C., such as greater than or equal to 380° C., greater than or equal to 390° C., greater than or equal to 400° C., greater than or equal to 420° C., or even greater than or equal to 450° C. In embodiments, the supercritical water 204 may have a temperature of from 374° C. to 600° C., from 380° C. to 600° C., from 390° C. to 600° C., from 400° C. to 600° C., from 420° C. to 600° C., or from 450° C. to 600° C. In embodiments, the temperature of the supercritical water 204 may be from 374° C. to 600° C. at a point immediately upstream of the mixing unit 220. The point immediately upstream of the mixing unit 220 may refer to the temperature being measured within a distance from the mixing unit 220 close enough so that heat losses from the piping between the temperature measuring device and the mixing unit 220 are not enough for the temperature of the supercritical water 204 to change by 1° C. or more. At a pressure of 22,000 kPa, when the temperature of the supercritical water 204 falls below 374° C., which is the supercritical point of water at 22,000 kPa, the water would no longer be in the supercritical phase. The methods of the present disclosure may include heating the pressurized water stream 216 in a furnace, such as the SWU furnace 210 or the visbreaker furnace 150, to produce the supercritical water 204 having a pressure of from 22,000 kPa to 30,000 kPa and a temperature of from 374° C. to 600° C.

Referring again to FIG. 2, the supercritical water 204 and the liquid hydrocarbon oil 172 may be passed to the mixing unit 220 and combined in the mixing unit 220. The supercritical water 204 and the liquid hydrocarbon oil 172 may be combined upstream of the mixing unit 220 or may be passed separately to the mixing unit 220 and combined within the mixing unit 220. As previously discussed, the mass flow ratio of the supercritical water 204 to the liquid hydrocarbon oil 172 passed to the mixing unit 220 may be from 0.1 to 50, such as from 0.1 to 25, from 0.1 to 20, from 0.1 to 5, from 1 to 50, from 1 to 25, from 1 to 10, from 1 to 5, from 5 to 50, from 5 to 25, or from 5 to 10. The mixing unit 220 may include a static mixer, an agitator-equipped vessel, a T-fitting, a Y-fitting, or combinations of these mixing units. The mixing unit 220 may be disposed downstream of the visbreaker effluent separation system 170 and upstream of the tubular reactor 230. The processes of the present disclosure may include mixing the liquid hydrocarbon oil 172 with the supercritical water 204 upstream of the tubular reactor 230. The mixing may comprise passing the supercritical water 204 and the liquid hydrocarbon oil 172 to the mixing unit 220 and mixing the supercritical water 204 and the liquid hydrocarbon oil 172 in the mixing unit 220 to produce a supercritical water reaction mixture 222.

Referring again to FIG. 2, as previously discussed, the SWU 202 may comprise the tubular reactor 230 disposed downstream of the mixing unit 220. At least a portion of or all of the tubular reactor 230 may be embedded within the convection section 212 of a furnace, such as but not limited to the SWU furnace 210, such that the tubular reactor 230 passes through the convection section 212 to maintain the supercritical water reaction mixture 222 at the reaction temperature. The tubular reactor 230 may have in inner diameter sufficient to produce a Reynolds number of greater than or equal to 6,000 at the target production rate, where the Reynolds number is calculated based on assuming a flow of 100% water through the tubular reactor 230 at the conditions (temperature/pressure/flow rate). In embodiments, the tubular reactor 230 may have an inner diameter of from 0.5 inches (1.3 centimeters) to 6 inches (15.2 centimeters). The inner diameter of the tubular reactor 230 may be determined based on the target production rate through the SWU 202 in combination with maintaining the Reynolds number greater than or equal to 6,000. Length of the of the tubular reactor 230 in the convection section 212 may be selected to maintain a residence time of the supercritical water reaction mixture 222 at the reaction temperature in a range of from 0.1 minute (min) to 60 min, from 0.1 min to 30 min, from 1 min to 60 min, or from 1 min to 30 min, where the residence time is calculated based on assuming a flow of 100% water through the tubular reactor 230.

The supercritical water reaction mixture 222 in the tubular reactor 230 may be maintained at the reaction temperature by heat transfer from the convection section 212 of the SWU furnace 210. The supercritical water reaction mixture 222 may be maintained at the reaction temperature of from 374° C. to 600° C., from 374° C. to 480° C., from 380° C. to 600° C., from 380° C. to 480° C., from 390° C. to 600° C., from 390° C. to 480° C., from 400° C. to 600° C., from 400° C. to 480° C., from 420° C. to 600° C., from 420° C. to 480° C., from 450° C. to 600° C., or from 450° C. to 480° C., where the reaction temperature is measured at the exit of the tubular reactor 230. In embodiments, a temperature of the SWU effluent 232 at the exit of the tubular reactor 230 may be from 374° C. to 600° C., from 374° C. to 480° C., from 380° C. to 600° C., from 380° C. to 480° C., from 390° C. to 600° C., from 390° C. to 480° C., from 400° C. to 600° C., from 400° C. to 480° C., from 420° C. to 600° C., from 420° C. to 480° C., from 450° C. to 600° C., or from 450° C. to 480° C. The pressure of the supercritical water reaction mixture 222 in the tubular reactor 230 may be from 22,000 kPa to 30,000 kPa.

During operation of the SWU 202, the supercritical water reaction mixture 222 may be passed directly from the mixing unit 220 to the tubular reactor 230. In the tubular reactor 230, the liquid hydrocarbon oil 172 may be contacted with the supercritical water 204 of the supercritical water reaction mixture 222 at the reaction temperature and pressure. Contacting the liquid hydrocarbon oil 172 with the supercritical water 204 at the reaction conditions may cause at least a portion of the polymer molecules from the liquid hydrocarbon oil 172 to disassociate to produce a supercritical water unit (SWU) effluent 232. Not intending to be bound by any particular theory, it is believed that polymer molecules from the liquid hydrocarbon oil 172 may undergo radical-mediated dissociation of polymer chains to produce hydrocarbons of reduced molecular weight. The supercritical water may provide the hydrogen for the radial-mediated dissociation. The lower molecular weight hydrocarbons produced may be dissolved into the supercritical water phase, which may suppress inter-radical reactions, which can result in formation of aromatic compounds and eventually coke.

The processes of the present disclosure may include passing the supercritical water reaction mixture 222 to the tubular reactor 230 and maintaining the supercritical water reaction mixture 222 at the reaction temperature and pressure in the tubular reactor 230 for a residence time sufficient to produce the SWU effluent 232. The residence time may be from 0.1 minutes to 60 minutes, such as from 1 minute to 30 minutes. The SWU effluent 232 may be passed out of the tubular reactor 230. The SWU effluent 232 may include an upgraded hydrocarbon oil having an average molecular weight less than the liquid hydrocarbon oil 172. The SWU effluent 232 exiting the tubular reactor 230 may have a temperature of from 374° C. to 600° C. and a pressure of from 22,000 kPa to 30,000 kPa.

Referring again to FIG. 2, in embodiments, the SWU effluent 232 may be passed to a heat exchanger 240 disposed downstream of the SWU 202. The SWU effluent 232 may be passed directly from the exit of the tubular reactor 230 to the heat exchanger 240. The heat exchanger 240 may be operable to cool the SWU effluent 232 to produce a cooled SWU effluent 242. The heat exchanger 240 may be any type of heat exchanger capable of cooling the SWU effluent 232 from the reaction temperature to a temperature less than 374° C. The cooled SWU effluent 242 may have a temperature of less than 374° C., which is below the supercritical point of water at 22,292 kPa. In embodiments, the cooled SWU effluent 242 may have a temperature of from 75° C. to less than 374° C., such as from 75° C. to 370° C., from 75° C. to 350° C., from 75° C. to 300° C., from 80° C. to less than 374° C., from 80° C. to 370° C., from 80° C. to 350° C., from 80° C. to 300° C., from 100° C. to less than 374° C., from 100° C. to 370° C., from 100° C. to 350° C., from 100° C. to 300° C., from 120° C. to less than 374° C., from 120° C. to 370° C., from 120° C. to 350° C., or from 120° C. to 300° C. The pressure of the cooled SWU effluent 242 may be between 22,000 kPa and 30,000 kPa.

Referring again to FIG. 2, in embodiments, the cooled SWU effluent 242 may be passed from the heat exchanger 240 to a depressurization unit 246 disposed downstream of the heat exchanger 240. The cooled SWU effluent 242 may be passed directly from the heat exchanger 240 to the depressurization unit 246. The depressurization unit 246 may be operable to reduce the pressure of the cooled SWU effluent 242 to a pressure less than 22,000 kPa to produce a cooled depressurized effluent 248. The cooled depressurized effluent 248 may have a pressure of less than 22,000 kPa. In embodiments, the cooled depressurized effluent 248 may have a pressure of from 200 kPa (2 bar) to 2000 kPa (20 bar). Although FIG. 2 shows the depressurization unit 246 disposed downstream of the heat exchanger 240, it is understood that, in embodiments, the heat exchanger 240 may be disposed downstream of the depressurization unit 246, or the heat exchanger 240 and the depressurization unit 246 may be integrated into a single unit operation in which cooling and depressurization of the SWU effluent 232 may be accomplished simultaneously to produce the cooled depressurized effluent 248.

Referring again to FIG. 2, the cooled depressurized effluent 248 may be passed to the SWU effluent separation system 250 which may be disposed downstream of the tubular reactor 230. The SWU effluent separation system 250 may be disposed downstream of the heat exchanger 240, the depressurization unit 246, or both. Passing the cooled depressurized effluent to the SWU effluent separation system 250 may separate the cooled depressurized effluent 248 to produce an upgraded hydrocarbon oil 252, which contains water, and a gas effluent 254. The SWU effluent separation system 250 may include one or a plurality of separation units operable to separate the cooled depressurized effluent 248 to produce an upgraded hydrocarbon oil 252 and a gas effluent 254. The processes of the present disclosure may include passing the cooled depressurized effluent 248 to the SWU effluent separation system 250 that separates the cooled depressurized effluent 248 to produce the upgraded hydrocarbon oil 252 and the gas effluent 254. In embodiments, the SWU effluent separation system 250 may comprise a separation column, such as but not limited to a flash column, a fractionation column, or a combination of these separation columns. In embodiments, the SWU effluent separation system 250 may be operated at a temperature of less than or equal to 450° C., such as from 75° C. to 450° C. In embodiments, the SWU effluent separation system 250 may be operable to separate the cooled depressurized effluent 248 according to differences in boiling point temperature and may have a separation temperature of less than or equal to 450° C., such as from 75° C. to 450° C.

Referring to FIG. 3, in embodiments, the SWU effluent separation system 250 may include at least one gas-liquid separator 260 and at least one water-hydrocarbon separator 270 downstream of the gas-liquid separator 260. The gas-liquid separator 260 may be operable to separate the cooled depressurized effluent 248 into the gas effluent 254 and a liquid effluent 262. The liquid effluent 262 may then be passed from the gas-liquid separator 260 to the water-hydrocarbon separator 270, which may separate the liquid effluent 262 into the upgraded hydrocarbon oil 252 and an aqueous effluent 272.

Referring again to FIG. 2, the gas effluent 254 may include light gases and steam from the SWU effluent 232. In embodiments, the gas effluent 254 may include water vapor, carbon monoxide, carbon dioxide, hydrogen gas ($H_2$), hydrogen chloride, chlorine gas, chloroalkanes, and light hydrocarbons produced in the SWU 202 or carried through the SWU 202 unit in the liquid hydrocarbon oil 172. The light hydrocarbons may include hydrocarbons having from 1 to 6 carbons atoms, such as but not limited to methane, ethane, ethylene, acetylene, propane, propylene, butanes, butenes, butynes, pentanes, pentenes, pentynes, hexanes, hexenes, hexynes, or other light hydrocarbons. In embodiments, the gas effluent 254 may include greater than or equal to 95%, greater than or equal to 98%, greater than or equal to 99%, or even greater than or equal to 99.9% of the hydrocarbons from the SWU effluent 232 having from 1 to 6 carbon atoms by weight or by mole. The chlorine-containing compounds in the gas effluent 254 may include but are not limited to hydrogen chloride, chlorine gas, chloroalkanes, or combinations of these. Chloroalkanes may include, but are not limited to methyl chloride, dichloromethane, trichloromethane, tetrachloromethane, chloroethanes, chloropropanes, or other chlorinated alkanes. In embodiments, the gas effluent 254 may include greater than or equal to 95%, greater than or equal to 98%, greater than or equal to 99%, greater than 99.9%, or even greater than or equal to 99.99% of the chlorine-containing compounds from the SWU effluent 232, by weight or by mole. The gas effluent 254 may further include greater than or equal to 98%, greater than or equal to 99%, or greater than or equal to 99.9% of the carbon monoxide, carbon dioxide, and hydrogen gas from the SWU effluent 232, by weight or by mole.

In embodiments, the gas effluent 254 may include water vapor, which may come from the excess supercritical water from the SWU 202. In embodiments, the SWU effluent separation system 250 may include one or more gas-liquid separators, flash columns, fractionation columns, or combinations of these operating at a cut point temperature of greater than 100° C. When the cut point temperature of the SWU separation system 250 is greater than 100° C., the gas effluent 254 may include greater than or equal to 95%, greater than or equal to 98%, greater than or equal to 99%, or even greater than or equal to 99.9% of the water vapor from the SWU effluent 232, by weight or by mole. The gas effluent 254 may be passed to one or more downstream treatment processes, such as processes to remove chlorine containing compounds; processes to recover steam, hydrogen, or both from the gas effluent 254; processes to recover light hydrocarbons for fuel gas or combination with other refinery stream; or combinations of these.

Referring again to FIG. 3, in embodiments, the SWU effluent separation system 250 may be operable to separate the cooled depressurized effluent 248 into the upgraded hydrocarbon oil 252, the gas effluent 254, and an aqueous effluent 256. In embodiments, the SWU effluent separation system 250 may include a gas-liquid separator operating at a cut point temperature less than 100° C. and a water-hydrocarbon separator downstream of the gas-liquid separator. In these embodiments, the gas effluent 254 may comprise only a small fraction of the water from the SWU effluent 232. The aqueous effluent 272 may comprise water and small amounts of hydrocarbons, light gases, or both soluble in the aqueous phase. The aqueous effluent 272 may include greater than or equal to 95%, greater than or equal to 98%, greater than or equal to 99%, or even greater than or equal to 99.9% of the water from the SWU effluent 232, by weight or by mole.

The upgraded hydrocarbon oil 252 may be in liquid phase at ambient conditions. The upgraded hydrocarbon oil 252 may comprise the hydrocarbons from the SWU effluent 232 having greater than or equal to 7 carbon atoms. The upgraded hydrocarbon oil 252 may include greater than or equal to 95%, greater than or equal to 98%, greater than or equal to 99%, or even greater than or equal to 99.9% of the hydrocarbons from the SWU effluent 232 having greater than or equal to 7 carbon atoms.

The upgraded hydrocarbon oil 252 may have a kinematic viscosity, chlorine content, and light hydrocarbon content that may make the upgraded hydrocarbon oil 252 suitable for use as a hydrocarbon feed to a steam cracking process or a hydrotreating process. The upgraded hydrocarbon oil 252 may have a kinematic viscosity that is less than the kinematic viscosity of the liquid hydrocarbon oil 172 recovered from the visbreaker effluent separation system 170. In embodiments, the upgraded hydrocarbon oil 252 passed out of the SWU effluent separation system 250 may have a kinematic viscosity of from 0.1 centistokes (cSt) to 500 cSt measured at 100° C., such as from 0.1 cSt to 100 cSt measured at 100° C. The kinematic viscosity of the SWU hydrocarbon oil 172 may be determined according to the standard test methods in ASTM D7042.

In embodiments, the upgraded hydrocarbon oil 252 may have a chlorine content of less than or equal to 1000 parts per million by weight (ppmw), or even less than or equal to 500 ppmw, based on the total weight of the upgraded hydrocarbon oil 252. In embodiments, the upgraded hydrocarbon oil 252 may have a hydrogen content of from 10 wt. % to 16 wt. %, such as from 10 wt. % to 14 wt. %, from 10 wt. % to 12 wt. %, from 12 wt. % to 16 wt. %, from 12 wt. % to 14 wt. %, or from 14 wt. % to 16 wt. % based on the total weight of the upgraded hydrocarbon oil 252, as determined according to the standard test methods in ASTM D7171. In embodiments, the upgraded hydrocarbon oil 252 may have an average relative molecular weight of fractions having boiling point temperatures greater than 220° C. of from 100 grams per mole (g/mol) to 800 g/mol, such as from 100 g/mol to 400 g/mol, from 100 g/mol to 200 g/mol, from 200 g/mol to 800 g/mol, from 200 g/mol to 400 g/mol, or from 400 g/mol to 800 g/mol, as determined according to the standard test method in ASTM D2503.

Referring again to FIG. 3, in embodiments, the visbreaker furnace 150 may be employed as the furnace for the SWU 202. The pressurized water stream 216 may be heated in the visbreaker furnace 150 to produce the supercritical water 204. In embodiments, the pressurized water stream 216 may be preheated by passing the pressurized water stream 216 through the radiation section 154 of the visbreaker furnace 150 to produce the supercritical water 204 at the exit from the radiation section 154. As previously discussed, the SWU 202 may comprise the tubular reactor 230 disposed downstream of the mixing unit 220. At least a portion of or all of the tubular reactor 230 may be embedded within the convection section 152 of the visbreaker furnace 150 such that the tubular reactor 230 passes through the convection section 152 to maintain the supercritical water reaction mixture 222 at the reaction temperature. The tubular reactor 230 may have any of the features previously discussed in the present disclosure for the tubular reactor 230.

The supercritical water reaction mixture 222 in the tubular reactor 230 may be maintained at the reaction temperature by heat transfer from the convection section 152 of the visbreaker furnace 150. The supercritical water reaction mixture 222 may be maintained at the reaction temperature of from 374° C. to 600° C., from 374° C. to 480° C., from 380° C. to 600° C., from 380° C. to 480° C., from 390° C. to 600° C., from 390° C. to 480° C., from 400° C. to 600° C., from 400° C. to 480° C., from 420° C. to 600° C., from 420° C. to 480° C., from 450° C. to 600° C., or from 450° C. to 480° C., where the reaction temperature is measured at the exit of the tubular reactor 230. In embodiments, a temperature of the SWU effluent 232 at the exit of the tubular reactor 230 may be from 374° C. to 600° C., from 374° C. to 480° C., from 380° C. to 600° C., from 380° C. to 480° C., from 390° C. to 600° C., from 390° C. to 480° C., from 400° C. to 600° C., from 400° C. to 480° C., from 420° C. to 600° C., from 420° C. to 480° C., from 450° C. to 600° C., or from 450° C. to 480° C. The pressure of the supercritical water reaction mixture 222 in the tubular reactor 230 may be from 22,000 kPa to 30,000 kPa.

During operation of the SWU 202, the supercritical water reaction mixture 222 may be passed directly from the mixing unit 220 to the tubular reactor 230. In the tubular reactor 230, the liquid hydrocarbon oil 172 may be contacted with the supercritical water 204 of the supercritical water reaction mixture 222 at the reaction temperature and pressure. Contacting the liquid hydrocarbon oil 172 with the supercritical water 204 at the reaction conditions may cause at least a portion of the polymer molecules from the liquid hydrocarbon oil 172 to disassociate to produce the supercritical water unit (SWU) effluent 232. As previously discussed, the SWU effluent 232 may be cooled in the heat exchanger 240, depressurized in the depressurization unit 246, and passed to the SWU effluent separation system 250. As shown in FIG. 3, in embodiments, the SWU effluent separation system 250 may include at least one gas-liquid separator 260 and at least one water-hydrocarbon separator 270 downstream of the gas-liquid separator 260. As previously discussed in the present disclosure, the SWU effluent separation system 250 may separate the cooled depressurized effluent 248 to produce the upgraded hydrocarbon oil 252, the gas effluent 254, and an aqueous effluent 272. The upgraded hydrocarbon oil 252, gas effluent 254, and aqueous effluent 272 may have any of the compositions or properties previously discussed for these streams.

The systems 100 and processes of the present disclosure may be used to produce the liquid hydrocarbon oil 172 or the upgraded hydrocarbon oil 252 as a feed stream for a steam cracking process or for a hydrotreating process for producing greater value products, such as light olefins or light aromatic compounds.

In a first aspect of the present disclosure, a process for converting solid plastic waste to hydrocarbon oil may include melting a feed comprising the solid plastic waste to produce a liquefied plastic stream and visbreaking the liquefied plastic stream in a visbreaker unit comprising a visbreaker furnace and a soaker vessel downstream of the visbreaker furnace. The visbreaking may comprise heating the liquefied plastic stream in the visbreaker furnace to produce a heated liquefied plastic stream having a temperature at which the plastic undergoes one or more chemical reactions to convert polymer molecules in the liquefied plastic stream to one or more smaller molecules, maintaining a heated liquefied plastic stream at the reaction temperature in the soaker vessel for a residence time to produce a visbreaker effluent, and injecting a stripping gas into the soaker vessel, where the stripping gas comprises at least one of steam, nitrogen, helium, argon, or combinations of these stripping gases. The process may further include introducing the stripping gas to the liquefied plastic stream upstream of the visbreaker furnace, the heated liquefied plastic stream downstream of the visbreaker furnace, or both. The process may further include separating the visbreaker effluent in a visbreaker effluent separation system to yield a product comprising liquid hydrocarbon oil and a lesser boiling effluent.

A second aspect of the present disclosure may include the first aspect, where the solid plastic waste may comprise chlorine-containing plastics and introducing the stripping gas to the liquefied plastic stream, the heated liquefied plastic stream, or both upstream of the soaker vessel may increase removal of chlorine from the heated liquefied plastic stream in the soaker vessel and reduces the concentration of chlorine in the liquid hydrocarbon oil.

A third aspect of the present disclosure may include either one of the first or second second aspects, where the stripping gas may be a dry stripping gas consisting essentially of nitrogen, helium, argon, or combinations of these, and maintaining the heated liquefied plastic stream at a reaction temperature of from 300° C. to 400° C. in the soaker vessel may cause thermal dechlorination of chloride-containing plastics in the heated liquefied plastic stream, where thermal dechlorination comprises an ionic chain reaction that removes chloride ions from the chloride-containing plastics to produce polyenes and hydrochloric acid.

A fourth aspect of the present disclosure may include either one of the first or second aspects, where the stripping gas comprises steam, and maintaining the heated liquefied plastic stream at a reaction temperature of from 300° C. to 400° C. in the soaker vessel may cause hydrothermal dechlorination of chloride-containing plastics in the liquefied plastic stream, where hydrothermal dechlorination comprises nucleophilic substitution of chloride ions from in the chloride containing plastics with hydroxyl groups from the steam to produce polyols and hydrochloric acid.

A fifth aspect of the present disclosure may include either one of the first or second aspects, where the stripping gas comprises steam and an inert gas selected from nitrogen, helium, argon, or combinations of these, and maintaining the heated liquefied plastic stream at a reaction temperature of from 300° C. to 400° C. in the soaker vessel may cause thermal dechlorination and hydrothermal dechlorination of chloride-containing plastics in the heated liquefied plastic stream.

A sixth aspect of the present disclosure may include any one of the first through fifth aspects, where the solid plastic waste in the feed may comprise one or more of polyolefins, polystyrenes, polyvinyl chlorides (PVC), polyethylene terephthalate (PET), or combinations of these.

A seventh aspect of the present disclosure may include any one of the first through sixth aspects, where the heating the liquefied plastic stream to the reaction temperature may comprise passing the liquefied plastic stream through the visbreaker furnace comprising a convection section and a radiation section downstream of the convection section.

An eighth aspect of the present disclosure may include the seventh aspect, comprising operating the visbreaker furnace at temperature of from 150 degrees Celsius (° C.) to 450 degrees Celsius (° C.).

A ninth aspect of the present disclosure may include either one of the seventh or eighth aspects, where the visbreaker furnace further may comprise a gas-fired heater, an oil-fired heater, an electric heater or combination thereof.

A tenth aspect of the present disclosure may include any one of the seventh through ninth aspects, where the convection section of the visbreaker furnace may comprise a gas-fired heater, an oil-fired heater, or both.

An eleventh aspect of the present disclosure may include any one of the seventh through tenth aspects, where the radiation section of the visbreaker furnace may comprise an electric heater.

A twelfth aspect of the present disclosure may include any one of the seventh through eleventh aspects, where the convection section may be separated from the radiation section by a partition.

A thirteenth aspect of the present disclosure may include any one of the seventh through twelfth aspects, comprising passing the liquefied plastic stream into the convection section of the visbreaker furnace by a metering pump, an extruder, or both.

A fourteenth aspect of the present disclosure may include any one of the seventh through thirteenth aspects, where a temperature of the heated liquefied plastic stream exiting the convection section of the visbreaker furnace may be from 150 degrees Celsius (° C.) to 350 degrees Celsius (° C.).

A fifteenth aspect of the present disclosure may include any one of the seventh through fourteenth aspects, where a residence time of the liquefied plastic stream in the convection section of the visbreaker furnace may be from 5 minutes to 30 minutes.

A sixteenth aspect of the present disclosure may include any one of the seventh through fifteenth aspects, where a temperature of the heated liquefied plastic stream exiting the radiation section of the visbreaker furnace may be from 250 degrees Celsius (° C.) to 450 degrees Celsius (° C.).

A seventeenth aspect of the present disclosure may include any one of the seventh through sixteenth aspects, where a residence time of the heated liquefied plastic stream in the radiation section of the visbreaker furnace may be from 5 minutes to 30 minutes.

A eighteenth aspect of the present disclosure may include any one of the first through seventeenth aspects, comprising introducing the stripping gas to the process at a pressure of from 300 Kilopascal (kPa) to 7,000 Kilopascal (kPa).

A nineteenth aspect of the present disclosure may include any one of the first through eighteenth aspects, comprising introducing the stripping gas between an outlet of the melting vessel and an inlet to the visbreaker furnace, where the temperature of the stripping gas may be from 120 degrees Celsius (° C.) to 270 degrees Celsius (° C.).

A twentieth aspect of the present disclosure may include any one of the first through nineteenth aspects, comprising passing the heated liquefied plastic stream from the visbreaker furnace to the soaker vessel, and introducing the stripping gas to the heated liquefied plastic stream between an outlet of the visbreaker furnace and an inlet of the soaker vessel, where the temperature of the stripping gas may be from 250 degrees Celsius (° C.) to 350 degrees Celsius (° C.).

A twenty-first aspect of the present disclosure may include any one of the first through twentieth aspects, comprising passing the heated liquefied plastic stream from the visbreaker furnace to the soaker vessel, and introducing the stripping gas to the heated liquefied plastic stream in the soaker vessel, wherein the temperature may be from 300 degrees Celsius (° C.) to 400 degrees Celsius (° C.).

A twenty-second aspect of the present disclosure may include any one of the first through twenty-first aspects, comprising maintaining a temperature of the soaker vessel at a reaction temperature of from 300 degrees Celsius (° C.) to 400 degrees Celsius (° C.) using an external heater, an internal heater, insulation, or a combination of these.

A twenty-third aspect of the present disclosure may include any one of the first through twenty-second aspects, where the residence time of the heated liquefied plastic stream in the soaker vessel may be from 5 minutes to 60 minutes.

A twenty-fourth aspect of the present disclosure may include any one of the first through twenty-third aspects, wherein the soaker vessel may comprise an agitator.

A twenty-fifth aspect of the present disclosure may include any one of the first through twenty-fourth aspects, comprising passing the visbreaker effluent to the visbreaker effluent separation system to produce liquid hydrocarbon oil and a lesser boiling effluent, wherein the visbreaker effluent separation system may operate at a separation temperature of less than 450 degrees Celsius (° C.).

A twenty-sixth aspect of the present disclosure may include any one of the first through twenty-fifth aspects, where the visbreaker effluent separation system may comprise a fractionation column, a flash column, or a combination thereof.

A twenty-seventh aspect of the present disclosure may include any one of the first through twenty-sixth aspects, where the pressure of the liquid hydrocarbon oil passed out of the visbreaker effluent separation system may be from 102 kPa to 304 kPa.

A twenty-eighth aspect of the present disclosure may include any one of the first through twenty-seventh aspects, where the liquid hydrocarbon oil may have a chlorine content less than 1000 parts per million by weight based on the total weight of the visbreaker effluent.

A twenty-ninth aspect of the present disclosure may include any one of the first through twenty-eighth aspects, where the liquid hydrocarbon oil may have a kinematic viscosity of 0.1 centistokes (cSt) at 100 degrees Celsius (° C.) to 500 centistokes (cSt) at 100 degrees Celsius (° C.).

A thirtieth aspect of the present disclosure may include any one of the first through twenty-ninth aspects, further comprising contacting the liquid hydrocarbon oil with supercritical water in a supercritical water unit at a pressure of from 22,000 kPa to 30,000 kPa and a temperature of from 374° C. to 600° C., where contacting the liquid hydrocarbon oil with the supercritical water may increase the light hydrocarbon content of the liquid hydrocarbon oil to produce a supercritical water unit effluent comprising an upgraded liquid hydrocarbon oil.

A thirty-first aspect of the present disclosure may include the thirtieth aspect, where the contacting the liquid hydrocarbon oil with the supercritical water may comprise passing the liquid hydrocarbon oil to a supercritical water unit; mixing the liquid hydrocarbon oil with the supercritical water to produce a supercritical water reaction mixture; and maintaining the temperature and pressure of the supercritical water reaction mixture for a residence time sufficient to increase the light hydrocarbon content of the liquid hydrocarbon oil to produce a supercritical water unit effluent comprising an upgraded liquid hydrocarbon oil.

A thirty-second aspect of the present disclosure may include the thirty-first aspect, further comprising maintaining the liquid hydrocarbon oil at a temperature of greater than or equal to 150° C. while passing the liquid hydrocarbon oil to the supercritical water unit.

A thirty-third aspect of the present disclosure may include any one of the thirtieth through thirty-second aspects, further comprising filtering the liquid hydrocarbon oil upstream of the supercritical water unit.

A thirty-fourth aspect of the present disclosure may include any one of the thirtieth through thirty-third aspects, where the supercritical water unit may comprise a mixing unit, a tubular reactor downstream of the mixing unit, and a furnace, wherein at least a portion of the tubular reactor may pass through the furnace.

A thirty-fifth aspect of the present disclosure may include the thirty-fourth aspect, where the mixing unit may comprise a static mixer, an agitator-equipped vessel, a T-fitting, a Y-fitting, or combinations of these mixing units.

A thirty-sixth aspect of the present disclosure may include either one of the thirty-fourth or thirty-fifth aspects, where the mixing may comprise passing the supercritical water and the liquid hydrocarbon oil to the mixing unit and mixing the supercritical water and the liquid hydrocarbon oil in the mixing unit to produce the supercritical water mixture.

A thirty-seventh aspect of the present disclosure may include any one of the thirty-fourth through thirty-sixth aspects, further comprising heating a pressurized water stream in the furnace to produce the supercritical water having a pressure of from 22,000 kPa to 30,000 kPa and a temperature of from 374° C. to 600° C.

A thirty-eighth aspect of the present disclosure may include the thirty-seventh aspect, where the pressurized water stream may have an electrical conductivity of less than or equal to 10 microsiemens per centimeter, a sodium content of less than or equal to 10 micrograms per liter, and a silica content of less than 6 micrograms per liter.

A thirty-ninth aspect of the present disclosure may include any one of the thirty-fourth through thirty-eighth aspects, where the furnace may be an SWU furnace separate from the visbreaker furnace, the SWU furnace comprising a convection section and a radiation section.

A fortieth aspect of the present disclosure may include any one of the thirty-fourth through thirty-eighth aspects, where the furnace may be the visbreaker furnace, and the at least a portion of the tubular reactor may pass through a convection section of the visbreaker furnace.

A forty-first aspect of the present disclosure may include the fortieth aspect, further comprising heating a pressurized water stream in the visbreaker furnace to produce the supercritical water, where the heating the pressurized water stream may comprise passing the pressurized water stream through a radiation section of the visbreaker furnace.

A forty-second aspect of the present disclosure may include any one of the thirtieth through forty-first aspects, further comprising separating the supercritical water unit effluent in an SWU effluent separation system to produce the upgraded liquid hydrocarbon oil and a gas effluent.

A forty-third aspect of the present disclosure may include the forty-second aspect, where separating the supercritical water unit effluent may comprise cooling the supercritical water unit effluent to a temperature less than 374° C. to produce a cooled SWU effluent; depressurizing the cooled SWU effluent to produce a cooled depressurized effluent; and passing the cooled depressurized effluent to the SWU effluent separation system that separates the cooled depressurized effluent to produce the upgraded liquid hydrocarbon oil and the gas effluent.

A forty-fourth aspect of the present disclosure may include any one of the first through forty-third aspects, further comprising providing a feed comprising the solid plastic waste.

A forty-fifth aspect of the present disclosure may include any one of the first through forty-fourth aspects, further comprising, before melting, chopping the solid plastic waste into small sizes of less than or equal to 50 millimeters.

A forty-sixth aspect of the present disclosure may include any one of the first through forty-fifth aspects, comprising melting the solid plastic waste in the melting vessel operated at a temperature of from 120 degrees Celsius (° C.) to 270 degrees Celsius (° C.) to produce liquefied plastic stream, where a residence time of the solid plastic waste in the melting vessel may be from 1 minute to 120 minutes.

A forty-seventh aspect of the present disclosure may include the forty-sixth aspect, comprising mixing the solid plastic waste in the melting vessel with an internal agitator, wherein the mixing distributes heat uniformly in the melting vessel.

A forty-eighth aspect of the present disclosure may include either one of the forty-sixth or forty-seventh aspects, comprising passing melt vessel stripping gas through a liquefied plastic and the solid plastic waste in the melting vessel and exhausting a gas stream comprising at least the melt vessel stripping gas and oxygen from the melting vessel, where a flow of the melt vessel stripping gas through the liquefied plastic and the solid waste plastic may remove oxygen from the melting vessel and the liquefied plastic in the melting vessel.

A forty-ninth aspect of the present disclosure may include any one of the forty-sixth through forty-eighth aspects, where an oxygen content of the melt vessel stripping gas may be less than 1 volume percent (vol. %).

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A system for converting solid plastic waste comprises:
   a melting vessel;
   a visbreaker unit in fluid communication with the melting vessel and downstream of the melting vessel, wherein the visbreaker unit comprises a visbreaker furnace and a soaker vessel downstream of the visbreaker furnace, wherein the visbreaker furnace comprises a convection section and a radiation section downstream of the convection section; and
   a visbreaker effluent separation unit in fluid communication with the visbreaker unit and downstream of the visbreaker unit wherein:
the visbreaker furnace is in fluid communication with the soaker vessel via a heated liquid plastic stream,
the system further comprises a stripping gas stream in fluid communication with the heated liquid plastic stream at a point between the visbreaker furnace and a stripper vessel; and
the stripping gas stream passes through the convection section, upstream of the point of fluid communication between the stripping gas stream and the heated liquid plastic stream.

2. The system of claim 1, further comprising a plastic grinder in fluid communication with the melting vessel and upstream of the melting vessel.

3. The system of claim 1, further comprising a supercritical water unit in fluid communication with the visbreaker effluent separation unit and downstream of the visbreaker effluent separation unit.

4. The system of claim 3, further comprising a supercritical water unit effluent separation system downstream of the supercritical water unit.

5. The system of claim 3, further comprising a filter in fluid communication with and disposed between the visbreaker effluent separation unit and the supercritical water unit, wherein the filter is configured to remove solid material.

6. The system of claim 1, further comprising a filter in fluid communication with and disposed between the melting vessel and the visbreaker unit, wherein the filter is configured to remove solid material.

7. The system of claim 1, further comprising a metering pump in fluid communication with and disposed between the melting vessel and the visbreaker unit.

8. The system of claim 1, wherein the melting vessel is in fluid communication with the visbreaker unit through at least one pipe, and the at least one pipe is heated externally.

9. The system of claim 1, wherein the radiation section is a thermal radiation section.

10. The system of claim 1, wherein the radiation section comprises an electric heater.

11. The system of claim 1, wherein the convection section and the radiation section are separated by a partition such that the convection section is out of sight of the radiation section.

12. A system for converting solid plastic waste comprises:
a melting vessel;
a visbreaker unit in fluid communication with the melting vessel and downstream of the melting vessel, wherein the visbreaker unit comprises a visbreaker furnace and a soaker vessel downstream of the visbreaker furnace;
a visbreaker effluent separation unit in fluid communication with the visbreaker unit and downstream of the visbreaker unit; and
a supercritical water unit in fluid communication with the visbreaker effluent separation unit and downstream of the visbreaker effluent separation unit, wherein the supercritical water unit comprises:
a mixing unit;
a pressurized water preheater upstream of and in fluid communication with a tubular reactor,
the tubular reactor being downstream of the mixing unit; and
a furnace, wherein:
the furnace is the visbreaker furnace;
the at least a portion of the tubular reactor passes through a convection section of the visbreaker furnace; and
at least a portion of the pressurized water preheater passes through a radiation section of the visbreaker furnace
wherein:
the visbreaker furnace is in fluid communication with the soaker vessel via a heated liquid plastic stream,
the system further comprises a stripping gas stream in fluid communication with the heated liquid plastic stream at a point between the visbreaker furnace and a stripper vessel; and
the stripping gas stream passes through the convection section, upstream of the point of fluid communication between the stripping gas stream and the heated liquid plastic stream.

13. The system of claim 12, further comprising a supercritical water unit effluent separation system downstream of the supercritical water unit.

14. The system of claim 12, further comprising a metering pump disposed between the visbreaker effluent separation unit and the supercritical water unit.

15. The system of claim 12, further comprising a filter disposed between the visbreaker effluent separation unit and the supercritical water unit, wherein the filter is configured to remove solid material.

16. The system of claim 12, wherein the radiation section of the visbreaker furnace is a thermal radiation section.

17. The system of claim 12, wherein the convection section and the radiation section are separated by a partition such that the convection section is out of sight of the radiation section.

* * * * *